United States Patent
Kobayashi et al.

(10) Patent No.: US 7,171,524 B2
(45) Date of Patent: Jan. 30, 2007

(54) STORAGE CONTROL SYSTEM AND CONTROL METHOD FOR STORAGE CONTROL WHICH SUPPRESS THE AMOUNT OF POWER CONSUMED BY THE STORAGE CONTROL SYSTEM

(75) Inventors: Naotaka Kobayashi, Odawara (JP); Yutaka Takata, Ninomiya (JP); Shinichi Nakayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 10/837,317

(22) Filed: May 3, 2004

(65) Prior Publication Data

US 2005/0210191 A1  Sep. 22, 2005

(30) Foreign Application Priority Data

Mar. 17, 2004  (JP)  ............................. 2004-077099

(51) Int. Cl.
*G06F 11/07* (2006.01)
(52) U.S. Cl. ..................... 711/147; 711/114; 714/9; 714/10; 714/11; 714/12; 714/13; 709/213
(58) Field of Classification Search ................ 714/13; 711/147
See application file for complete search history.

(56) References Cited

U.S. PATENT DOCUMENTS

| | | | | |
|---|---|---|---|---|
| 5,155,835 A | * | 10/1992 | Belsan | 711/114 |
| 5,434,998 A | * | 7/1995 | Akai et al. | 714/11 |
| 5,588,111 A | * | 12/1996 | Cutts et al. | 714/9 |
| 6,363,464 B1 | * | 3/2002 | Mangione | 711/167 |
| 6,839,788 B2 | | 1/2005 | Pecone | |
| 6,845,467 B1 | * | 1/2005 | Ditner et al. | 714/11 |
| 6,931,568 B2 | * | 8/2005 | Abbondanzio et al. | 714/11 |
| 6,948,008 B2 | * | 9/2005 | Hawkins et al. | 710/15 |
| 2002/0152339 A1 | | 10/2002 | Yamamoto | 710/36 |

(Continued)

FOREIGN PATENT DOCUMENTS

EP  1315074 A2  5/2003

(Continued)

OTHER PUBLICATIONS

Dekoning R et al. "Dual Active Redundant Controllers: The High Road to Performance and Availability" 8211 Computer Technology Reviewb Mar. 15, 1995, No. 3, Los Angeles, CA, USA, p. 44.

*Primary Examiner*—Sanjiv Shah
*Assistant Examiner*—Arpan Savla
(74) *Attorney, Agent, or Firm*—Mattingly, Stanger, Malur & Brundidge, P.C.

(57) ABSTRACT

One or more master CHN 21AM and one or more back-up CHN 21AC are provided. In each of the one or more back-up CHNs 21AC, the I/O processor 504 is in a power on state, and the NAS processor is in a power off state. The I/O processor 504 accesses a shared memory 25 periodically, and if the fact that a problem has occurred in any master CHN 21AM has been written to the shared memory 25, then the power supply of the NAS processor 506 is turned on, and processing is carried out for switching the back-up CHN 21AC in which the I/O processor 504 is installed, to a master CHN 21 AM.

20 Claims, 26 Drawing Sheets

U.S. PATENT DOCUMENTS

| | | | |
|---|---|---|---|
| 2002/0178143 A1 | 11/2002 | Fujimoto | 707/1 |
| 2003/0105767 A1 | 6/2003 | Sonoda et al. | 707/100 |
| 2004/0025078 A1* | 2/2004 | Nagano et al. | 714/11 |
| 2004/0139168 A1 | 7/2004 | Tanaka et al. | |
| 2004/0153721 A1 | 8/2004 | Fujimoto | |
| 2005/0114615 A1 | 5/2005 | Ogasawara et al. | |

FOREIGN PATENT DOCUMENTS

| | | |
|---|---|---|
| JP | 2002 351703 | 12/2002 |
| JP | 2003 162439 | 6/2003 |

* cited by examiner

FIG. 6

LU MANAGEMENT TABLE
(EXISTS FOR EACH LU-GID)

| LU-GID | LUN | LU STATE | ..... |
|--------|------|----------|-------|
| #1 | #001 | LOCKED | ..... |
| #1 | #002 | – | ..... |
| #1 | #003 | – | ..... |
| ⋮ | ⋮ | ⋮ | ⋮ |
| #1 | #n | – | |

| BLADE ID | NODE NAME | DIVISION | STATE | LU-GID |
|---|---|---|---|---|
| 1 | BLADE A | MASTER | ACTIVE | 2 |
| 2 | BLADE B | MASTER | ACTIVE | 3 |
| 3 | BLADE C | MASTER | ACTIVE | 4,5 |
| : | : | : | : | : |
| 9 | BLADE Z | BACK UP | STAND BY | NONE |
| 10 | BLADE V | BACK UP | STAND BY | NONE |
| : | : | : | : | : |

901B

| MASTER | | BACK UP | |
|---|---|---|---|
| BLADE ID | NODE NAME | BLADE ID | NODE NAME |
| 1 | BLADE A | 9 | BLADE Z |
| 2 | BLADE B | 8 | BLADE X |
| 3 | BLADE C | 10 | BLADE V |
| : | : | : | : |
| 9 | BLADE Z | 1 | BLADE A |
| 10 | BLADE V | 2 | BLADE C |
| : | : | : | : |

FIG. 8(A)

| MASTER | | BACK UP | |
|---|---|---|---|
| BLADE ID | NODE NAME | BLADE ID | NODE NAME |
| 1 | BLADE A | 11 | BLADE H |
| 2 | BLADE B | 12 | BLADE I |
| ⋮ | ⋮ | ⋮ | ⋮ |

FIG. 8(B)

| MASTER | | BACK UP | |
|---|---|---|---|
| BLADE ID | NODE NAME | BLADE ID | NODE NAME |
| 1 | BLADE A | 11 | BLADE H |
| 1 | BLADE A | 12 | BLADE I |
| 2 | BLADE B | 13 | BLADE J |
| 2 | BLADE B | 14 | BLADE K |
| 2 | BLADE B | 15 | BLADE L |
| ⋮ | ⋮ | ⋮ | ⋮ |

FIG. 8(C)

| MASTER | | BACK UP | |
|---|---|---|---|
| BLADE ID | NODE NAME | BLADE ID | NODE NAME |
| 1 | BLADE A | 11 | BLADE H |
| 2 | BLADE B | 11 | BLADE H |
| 1 | BLADE A | 12 | BLADE I |
| 2 | BLADE B | 12 | BLADE I |
| 3 | BLADE C | 12 | BLADE I |
| ⋮ | ⋮ | ⋮ | ⋮ |

FIG. 8(D)

| MASTER | | BACK UP | |
|---|---|---|---|
| BLADE ID | NODE NAME | BLADE ID | NODE NAME |
| 1 | BLADE A | 11 | BLADE H |
| 2 | BLADE B | 11 | BLADE H |
| 1 | BLADE A | 12 | BLADE I |
| 2 | BLADE B | 12 | BLADE I |
| 2 | BLADE B | 15 | BLADE L |
| ⋮ | ⋮ | ⋮ | ⋮ |

FIG. 9

| CATEGORY | LU-GID | LUN | TYPE |
|---|---|---|---|
| MASTER | 0 | 0~m | SYSTEM LU |
|  | 1 | 0~r | SHARED LU |
|  | 2~P | 0~n | USER LU |
| BACK UP | 0 | 0~m | SYSTEM LU |
|  | 1 | 0~r | SHARED LU |
|  | 2~P | 0~n | USER LU |

| BLADE ID | NODE NAME | CATEGORY | STATE | LU-GID |
|---|---|---|---|---|
| 1 | BLADE A | MASTER | ACTIVE | 2 |
| 2 | BLADE B | MASTER | ACTIVE | 3 |
| 3 | BLADE C | MASTER | ACTIVE | 4 |
| ⋮ | ⋮ | ⋮ | ⋮ | ⋮ |
| 9 | BLADE Z | BACK UP | STAND BY | NONE |
| 10 | BLADE V | BACK UP | STAND BY | NONE |
| ⋮ | ⋮ | ⋮ | ⋮ | ⋮ |

| BLADE ID | NODE NAME | CATEGORY | STATE | LU-GID |
|---|---|---|---|---|
| 1 | BLADE A | MASTER | DUMPING | 2 |
| 2 | BLADE B | MASTER | ACTIVE | 3 |
| 3 | BLADE C | MASTER | ACTIVE | 4 |
| ⋮ | ⋮ | ⋮ | ⋮ | ⋮ |
| 9 | BLADE Z | BACK UP | STAND BY | NONE |
| 10 | BLADE V | BACK UP | STAND BY | NONE |
| ⋮ | ⋮ | ⋮ | ⋮ | ⋮ |

| BLADE ID | NODE NAME | CATEGORY | STATE | LU-GID |
|---|---|---|---|---|
| 1 | BLADE A | MASTER | SHIFT READY | 2 |
| 2 | BLADE B | MASTER | ACTIVE | 3 |
| 3 | BLADE C | MASTER | ACTIVE | 4 |
| ⋮ | ⋮ | ⋮ | ⋮ | ⋮ |
| 9 | BLADE Z | BACK UP | STAND BY | NONE |
| 10 | BLADE V | BACK UP | STAND BY | NONE |
| ⋮ | ⋮ | ⋮ | ⋮ | ⋮ | ized by providing a plurality of disk type storage devices in an array fashion.
STORAGE CONTROL SYSTEM AND CONTROL METHOD FOR STORAGE CONTROL WHICH SUPPRESS THE AMOUNT OF POWER CONSUMED BY THE STORAGE CONTROL SYSTEM

CROSS-REFERENCE TO PRIOR APPLICATION

This application relates to and claims priority from Japanese Patent Application No. 2004-77099, filed on Mar. 17, 2004, the entire disclosure of which is incorporated herein by reference.

BACKGROUND OF THE INVENTION

1. Field of the Invention

The present invention relates to a storage control system and control method for a storage control system.

2. Description of the Related Art

For example, in a database system for handling large volumes of data, such as that in a data centre, or the like, data is managed by using a storage control system constituted separately from the host computer. This storage control sub-system comprises, for example, a RAID (Redundant Array of Independent Inexpensive Disks) constituted by providing a plurality of disk type storage devices in an array fashion.

As disclosed in Japanese Patent Laid-open No. 2003-162439, for example, a storage control system of this kind may comprise a plurality of file interfaces fitted with file servers for processing I/O requests in file units, and block interfaces for processing I/O requests in disk block units.

In a file interface as described above, a greater volume of processing is carried out than in a block interface, for example, processing for converting a file unit I/O request into a disk block unit I/O request. Therefore, the file interface has a higher level of functionality than the block interface, and it consumes a greater amount of electrical power.

SUMMARY OF THE INVENTION

Therefore, it is an object of the present invention to suppress the amount of power consumed by a storage control system provided with file interfaces.

Further objects of the present invention will become apparent from the following description.

The storage control system according to a first aspect of the present invention is a storage control system for controlling the storage of data in storage devices, comprising: a plurality of storage devices for storing data; a storage device control section for controlling the storage of data in the plurality of storage devices; a connecting section connected to the storage device control section; a plurality of channel control sections connected to a local area network external to the storage control system, and to the connecting section; a shared memory in which control information exchanged by a first channel control section of the channel control section and the storage device control section is stored; and a cache memory for temporarily holding data exchanged between the first channel control section and the storage device control section.

The plurality of channel control sections includes one or more first channel control sections and one or more second control sections. The first channel control sections have a first processor for converting file level data received via the local area network into block level data, and a second processor for storing the block level data in the storage devices, via the connecting section and the storage device control section, and the first processor and the second processor are able to operate normally, in a normal state (for example, a power on state). The second channel control sections have a third processor for converting file level data received via the local area network into block level data, and a fourth processor for storing the block level data in the storage devices, via the connecting section and the storage device control section, and the third processor assumes a power saving state in cases where the first channel control section is operating normally, and the third processor operates normally, in cases where a problem has occurred in the first channel control section. The second processor of the first channel control section and the fourth processor of the second channel control section transmit the fact that a problem has occurred in the first channel control section, by means of the shared memory.

In a first embodiment of the storage control system according to the first aspect of the present invention, the second processor of the first channel control section writes problem occurrence information indicating that the problem has occurred, to the shared memory. The fourth processor in any one of a plurality of the second channel control sections carries out exclusion processing for prohibiting a further second channel control section from switching to the first channel control section, if it has detected the problem occurrence information, and executes switching processing for switching the one second channel control section to the first channel control section. More specifically, for example, the fourth processor in one second channel control section prohibits other second channel control sections from accessing the shared storage region where the continuation information required in order to operate as a first channel control section is stored, and it accesses the shared storage region and acquires the continuation information stored in that shared storage region.

In a second embodiment of the storage control system according to the first aspect of the present invention, the second processor of the first channel control section sets the first processor to a power saving state, if the problem has occurred. The fourth processor of the second channel control section releases the power saving state of the third processor, if it has detected that the problem has occurred in the first channel control section.

In a third embodiment of the storage control system according to the first aspect of the present invention, category information indicating whether a channel control section is a first or a second channel control section is registered in the shared memory, for each of the plurality of channel control sections. For example, the second processor or the fourth processor changes the category information corresponding to the first channel control section, to information indicating that the corresponding channel control section is a second channel control section, if the problem has occurred.

In a fourth embodiment of the storage control system according to the first aspect of the present invention, two or more logical units, which are logical devices for storing data, are provided in the plurality of storage devices. Corresponding logical unit information indicating which logical unit is used by a channel control, of the two or more logical units, is registered in the shared memory for each of the plurality of channel control sections. For example, the second processor or the fourth processor erases the first corresponding logical unit information corresponding to the first channel control section, if the problem has occurred, and associates the first corresponding logical unit information with the second channel control section.

In a fifth embodiment of the storage control system according to the first aspect of the present invention, correspondence data indicating the correspondence relationships between the first channel control sections and the second channel control sections is stored in the shared memory. In the correspondence data, the first channel control sections and the second channel control sections are associated in at least one of the following states, (A)–(D):

(A) the number of the second channel control sections corresponding to one of the first channel control sections is one, and the number of the first channel control sections corresponding to one of the second channel control sections is one;

(B) the number of the second channel control sections corresponding to one of the first channel control sections is two or more, but the number of the first channel control sections corresponding to one of the second channel control sections is one;

(C) the number of the first channel control sections corresponding to one of the second channel control sections is two or more, but the number of the second channel control sections corresponding to one of the first channel control sections is one;

(D) the number of the second channel control sections corresponding to one of the first channel control sections is two or more, and the number of the first channel control sections corresponding to one of the second channel control sections is also two or more.

In this case, for example, the fourth processor of the second channel control section refers to the correspondence data, and if a problem has occurred in a first channel control section corresponding to the second channel control section in which that fourth processor is installed, then releases the power saving state of the third processor in the second channel control section in which it is installed.

In a sixth embodiment of the storage control system according to the first aspect of the present invention, in the first channel control section, a plurality of second processors exist with respect to one of the first processors, and even if a problem occurs in any one of the plurality of second processors, then a further second processor of the plurality of second processors writes the fact that the problem has occurred, to the shared memory.

In a seventh embodiment of the storage control system according to the first aspect of the present invention, the plurality of channel control sections include one or more third channel control sections. Each of the third channel control sections has a fifth processor for converting file level data received via the local area network into block level data, and a sixth processor for storing the block level data in the storage devices, via the connecting section and the storage device control section. The second channel control section and the third channel control section assume a standby state in such a manner that they can operate as a first channel control section, in the place of the first channel control section in which the problem has occurred, but the fifth processor of the third channel control section assumes a normal state, unlike the third processor of the second channel control section. If the problem has occurred in the first channel control section, then the third channel control section becomes the first channel control section, by means of the fifth processor of the third channel control section operating in a normal state, and the power saving state of the third processor of the second channel control section is released and the second channel control section becomes the third channel control section.

In an eighth embodiment of the storage control system according to the first aspect of the present invention, in the seventh embodiment described above, the second processor of the first channel control section writes problem occurrence information indicating that the problem has occurred, to the shared memory. The fourth processor of each of the plurality of second channel sections, and the sixth processor of each of the one or more third channel control sections accesses the shared memory, and if the fourth processor has detected the problem occurrence information prior to the sixth processor, then the fourth processor ignores the information.

In a ninth embodiment of the storage control system according to the first aspect of the present invention, in the seventh embodiment described above, if a separate channel control section to a first channel control section in which the problem has occurred is installed in the storage control system, then the separate channel control section is started up as the second channel control section. More specifically, for example, the second, fourth or sixth processor sets the category information corresponding to the first channel control section in which the problem has occurred, to information indicating that the corresponding channel control section is a second channel control section, whereupon the first channel control section in which the problem has occurred is exchanged for the separate channel control section. A processor installed in the separate channel control section thus exchanged starts up the separate channel control section as a second channel control section, by detecting the category information corresponding to that separate channel control section to be category information corresponding to the first channel control section in which the problem has occurred.

The method according to a second aspect of the present invention is a control method for a storage control system for controlling the storage of data in storage devices. The storage control system comprises a plurality of channel control sections connected to a local area network that is external to the storage control system. The plurality of channel control sections includes one or more first channel control section which is in a normal state, and one or more second channel control sections which assume a standby state in which they can operate as the first channel control sections. The first channel control sections have first and second processors, and the second channel control sections have third and fourth processors. The first and third processors are processors which receive file level data from the external local area network and convert same to block level data, when in a normal state. The second and fourth processors are processors which output the converted block level data to the storage devices, when in a normal state. In this case, the control method comprises steps whereby: if a problem has occurred in the first channel control section, the second processor records the fact that the problem has occurred, in a shared memory; the fourth processor of the second channel control section refers to the shared memory and detects the fact that the problem has occurred in the first channel control section; and the third processor of the second channel control section releases the power saving state, if it has been detected that the problem has occurred.

In a first embodiment of the method according to the second aspect of the present invention, the second processor of the first channel control section performs a step of writing problem occurrence information indicating that the problem has occurred, to the shared memory. Moreover, the fourth processor in any one second channel control section of a plurality of the second channel control sections performs a step of carrying out exclusion processing for prohibiting a further second channel control section from switching to the first channel control section, if it has detected the problem occurrence information, and executing switching processing for switching the one second channel control section to the first channel control section.

In a second embodiment of the method according to the second aspect of the present invention, the second processor of the first channel control section performs a step of setting the first processor to a power saving state, if the problem has occurred. Furthermore, the fourth processor of the second channel control section performs a step of releasing the power saving state of the third processor, if it has detected that the problem has occurred in the first channel control section.

In a third embodiment of the method according to the second aspect of the present invention, category information indicating whether a channel control section is a first or a second channel control section is registered in the shared memory, for each of the plurality of channel control sections; and the second processor or the fourth processor performs a step of changing the category information corresponding to the first channel control section, to information indicating that the corresponding channel control section is a second channel control section, if the problem has occurred.

In a fourth embodiment of the method according to the second aspect of the present invention, two or more logical units, which are logical devices for storing data, are provided in the plurality of storage devices; corresponding logical unit information indicating which logical unit is used by a channel control, of the two or more logical units, is registered in the shared memory for each of the plurality of channel control sections; and the second processor or the fourth processor performs a step of erasing the first corresponding logical unit information corresponding to the first channel control section, if the problem has occurred, and associating the first corresponding logical unit information with the second channel control section.

In a fifth embodiment of the method according to the second aspect of the present invention, correspondence data indicating the correspondence relationships between the first channel control sections and the second channel control sections are stored in the shared memory; and in the correspondence data, the first channel control sections and the second channel control sections are associated in at least one of the following states, (A)–(D):

(A) the number of the second channel control sections corresponding to one of the first channel control sections is one, and the number of the first channel control sections corresponding to one of the second channel control sections is one;

(B) the number of the second channel control sections corresponding to one of the first channel control sections is two or more, but the number of the first channel control sections corresponding to one of the second channel control sections is one;

(C) the number of the first channel control sections corresponding to one of the second channel control sections is two or more, but the number of the second channel control sections corresponding to one of the first channel control sections is one;

(D) the number of the second channel control sections corresponding to one of the first channel control sections is two or more, and the number of the first channel control sections corresponding to one of the second channel control sections is also two or more;

and the fourth processor of the second channel control section refers to the correspondence data, and if a problem has occurred in a first channel control section corresponding to the second channel control section in which that fourth processor is installed, then it performs the step of releasing the power saving state of the third processor in the second channel control section in which it is installed.

In a sixth embodiment of the method according to the second aspect of the present invention, there exist a plurality of second processors for each first processor in the first channel control sections; and if a problem occurs in any one of the plurality of second processors, then a further second processor of the plurality of second processors performs the step of writing the fact that the problem has occurred, to the shared memory.

In a seventh embodiment of the method according to the second aspect of the present invention, the plurality of channel control sections include one or more third channel control sections, which assume a standby state in such a manner that they can operate as the first channel control sections; the third channel control sections have a fifth and a sixth processor which are in a normal state; the fifth processor is a processor which receives file level data from the external local area network and converts same to block level data, when in a normal state; and the sixth processor is a processor which outputs the converted block level data to the storage devices, when in a normal state; the sixth processor of the third channel control section performs a step of referring to the shared memory and detecting the fact that the problem has occurred in the first channel control section; the fifth processor of the third channel control section performs the step of acquiring information used by the first processor of the first channel control section, and causing the third channel control section to operate as a first channel control section; and the third processor of the second channel control section performs the step of releasing the power saving state, when the third channel control section operates as the first channel control section.

In an eighth embodiment of the method according to the second aspect of the present invention, in the seventh embodiment described above, the second processor of the first channel control section performs a step of writing problem occurrence information indicating that the problem has occurred, to the shared memory, and the fourth processor of each of the plurality of second channel sections, and the sixth processor of each of the one or more third channel control sections perform a step of accessing the shared memory, and if the fourth processor has detected the problem occurrence information prior to the sixth processor, then the fourth processor performs a step of ignoring the information.

In a ninth embodiment of the method according to the second aspect of the present invention, in the eighth embodiment described above, if a separate channel control section to a first channel control section in which the problem has occurred is installed in the storage control system, then a step is performed of starting up the separate channel control section as the second channel control section.

BRIEF DESCRIPTION OF THE DRAWINGS

FIG. 6 shows an example of the composition of a LU management table 903;

FIG. 7 shows an example of the composition of CHN relationship management data 901;

FIG. 8 shows a variation example of the correspondences between the node management data 901A and the node correspondence data 901B;

FIG. 9 shows an example of the composition of LU nexus definition data 905;

FIG. 17 shows the sequence of changing the node management data 901A in the processing sequence illustrated in FIG. 16;

DESCRIPTION OF THE PREFERRED EMBODIMENTS

An overview of one embodiment of the present invention is now described.

In the present embodiment, the storage control system comprises a plurality of disk type storage devices, disk adapters forming interfaces relating to the plurality of disk types storage devices, and a plurality of NAS (Network Area Storage) blades.

Each of the plurality of NAS blades is provided with a NAS processor and one or more I/O (Input/Output) processors. A NAS processor is a processor of higher performance (for example, a processor having a higher operating clock frequency) than an I/O processor, and it consumes a greater amount of electrical power. A NAS processor receives file level data by means of a communications network (for example, a LAN) that is external to the storage control system, and converts this data to block level data. An I/O processor outputs the converted block level data to a disk adapter.

The plurality of NAS blades comprise one or more master NAS blade and one or more back-up NAS blade. In each of the one or more master NAS blades, both the NAS processor and the I/O processor assume a normal state (for example, a power supply on state in the NAS processor). On the other hand, in each of the one or more back-up NAS blades, the I/O processor assumes a normal state, but the NAS processor assumes a power saving state (for example, a power supply off state in the NAS processor). In other words, each of the back-up NAS blades assumes a so-called standby state in which it is able to operate instead of the master NAS blade, but rather than setting the NAS processor to a standby state which is a normal state (a "hot standby" " state), the NAS processor is set to a standby state which is a power saving state (a "cold standby" state).

In this case, if a problem occurs in any of the master NAS blades, then the NAS processor of that master NAS blade (hereinafter, called "master NAS processor") is set to a power saving state. For example, the I/O processor of that master NAS blade sets the master NAS processor from a normal state to a power saving state.

Thereupon, in a back-up NAS blade which has detected that a problem has occurred in the aforementioned master NAS blade, the NAS processor which has been in a power saving state (hereinafter, called the "back-up NAS processor") is set to a normal state. For example, the I/O processor of that back-up NAS blade sets the back-up NAS processor from a power saving state to a normal state. The back-up NAS processor that has been set to a normal state acquires information relating to the aforementioned master NAS blade (for example, the file metadata managed by that master NAS blade), and performs driving as a master NAS processor in a normal state.

Below, the present embodiment is described in detail with reference to the drawings.

Figure 1:
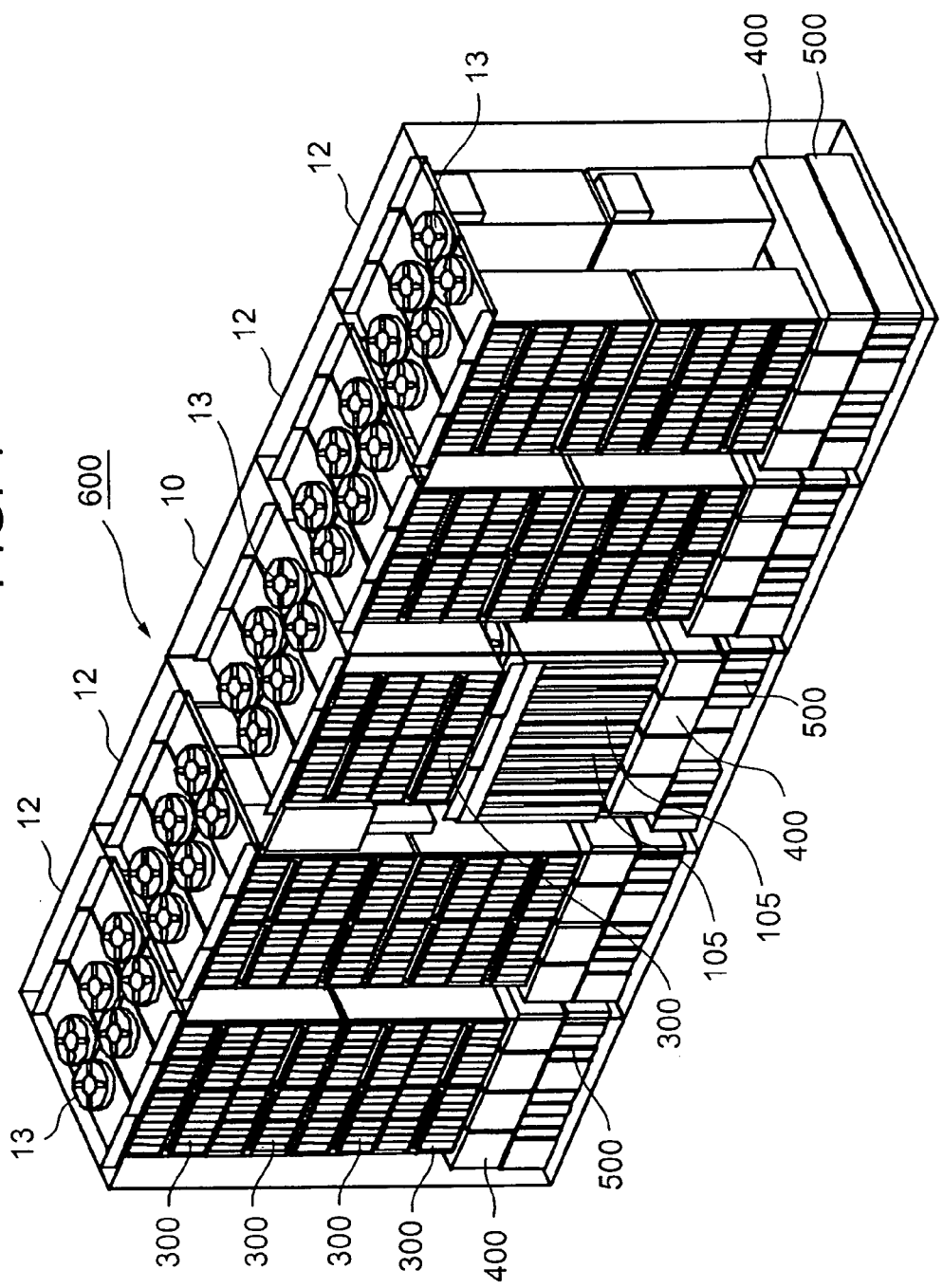
FIG. 1 shows a general view of the external appearance of a storage control system relating to one embodiment of the present invention.

FIG. 1 shows a general view of the external appearance of a storage control system relating to one embodiment of the present invention.

The storage control system 600 may be constituted by a base frame unit 10, and a plurality of add-on frame units 12 (although it may also be constituted by a base frame unit 11 only.).

The base frame unit 10 is the smallest composition unit of the storage control system 600. Provided respectively in a detachable manner in this base frame unit 10 are, for example, a plurality of disk type storage devices (for example, hard disk drives (HDD)) 300, a plurality of control packages (for example, channel control sections or display control sections) 105, a plurality of power units 400, and a plurality of parity units 500. Furthermore, a plurality of cooling fans 13 are also provided in the base frame unit 10.

Each add-on frame 12 is an optional storage control system 600, for example, a maximum of four add-on frames 12 can be connected to any one base frame unit 10. Furthermore, a plurality of cooling fans 13 are also provided in each add-on frame unit 12. A plurality of disk type storage devices 300, a plurality of power supply units 400, and a plurality of parity units 500 are provided in a respectively detachable fashion, in each of the add-on frame units 12, these respective elements each being controlled by means of a control function of a control package 105 provided in the base frame unit 10.

Figure 2:
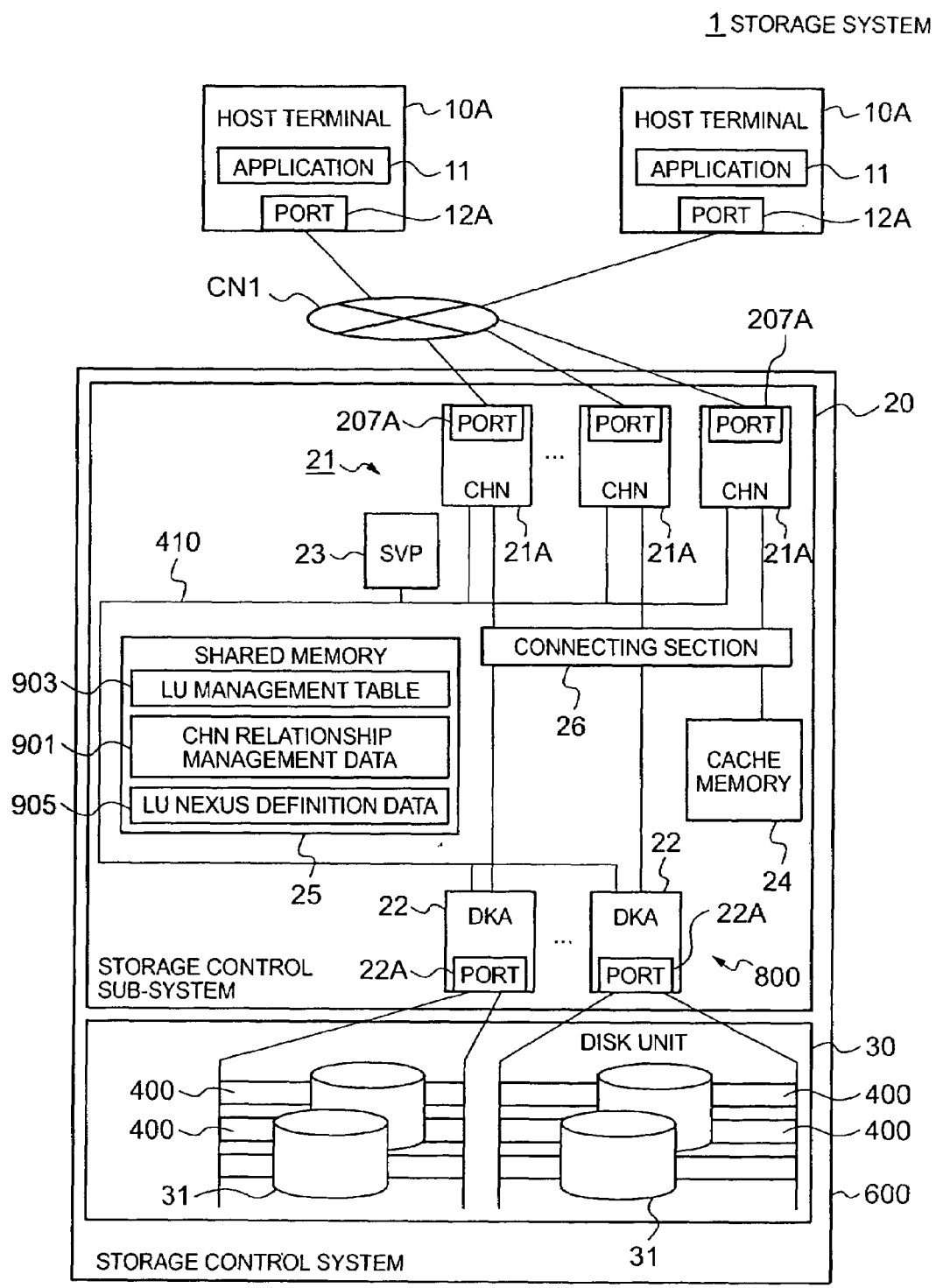
FIG. 2 is a block diagram showing the composition of a storage system relating to the present embodiment.

FIG. 2 is a block diagram showing the composition of a storage system relating to the present embodiment.

One or a plurality of host devices 10A, for example, are respective computer 1C devices provided with information processing resources, such as a CPU (Central Processing Unit), memory, and the like, and they are constituted in the form of a personal computer, workstation, main frame computer, or the like. The host terminals 10A respectively comprise, for example, information input devices (not illustrated), such as keyboard switches, pointing device, microphone, or the like, and information output devices (not illustrated), such as a monitor display, speakers, and the like, for example. Moreover, each host terminal 10A comprises, for example, an application program 11, such as database software using storage regions provided by a storage control system 600, and an adapter 12A for accessing the storage control system 600 via a communications network CN1.

The host terminal 10A is connected to the storage control system 600 via a communications network CN1. The communications network CN1 is a communications network for exchanging data at file level, and according to circumstances, a LAN, the Internet, a dedicated circuit, a public circuit, or the like, could be used for same (hereinafter, it is supposed that the first communications network is a "LAN"). Data communications via the LAN are conducted in accordance with a TCP/IP (Transmission Control Protocol/Internet Protocol), for example. The host terminal 10A requests data input and output in file units, to the storage control system 600, by specifying a file name. The adapter 12A connected to the LAN CN1 is a network card (illustrated as "PORT") which is compatible with a LAN, for example.

The storage control system 600 is, for example, a RAID system comprising a plurality of disk storage device 50 arranged in an array fashion. The storage control system 600 may be divided broadly into a storage control sub-system 20 and a disk unit 30. The storage control sub-system 20 comprises, for example, a channel control section 21, a disk control section 800, an SVP (Service Processor) 23, a cache memory 24, a shared memory 25 and a connecting section 26. The channel control section 21 comprises, for example, a plurality of NAS blades (also called "channel adapter NAS", hereinafter, referred to as "CHN" as an abbreviation of the channel adapter NAS) 21A. The disk control section 800 comprises a plurality of disk adapters (DKA) 22.

The CHN 21A conducts data communications with the host terminal 10A. The CHN 21A is provided with a communications port 207A for performing communications with the host terminal 10A. Moreover, the CHN 21A is constituted, for example, by a microcomputer system comprising a CPU, memory, and the like, and it interprets and executes various commands received from the host terminal 10A. The CHN 21A is assigned with a network address (for example, an IP address or WWN), for identifying that CHN 21A. The CHA 21A is able to receive an I/O command for a file unit from a host terminal 10, via the LAN CN1, (for example, a command containing a file name, and a command for reading or writing a file having that file name, hereinafter, referred to as a "file I/O command"), and behave as a NAS (Network Attached Storage) for processing that file I/O command. The composition and functions of the CHN 21A are described in detail hereinafter.

The respective DKAs 22 perform data exchange with the logical storage units (hereinafter, LUs) 31 in the disk unit 30. Each DKA 22 is provided with a communications port for connecting to a disk type storage device 400 which provides the LUs 31. Moreover, each DKA 22 is constituted in the form of a microcomputer having a CPU, a memory, and the like. Each DKA 22 writes data received from the CHN 21A or the CHA 21C, to the LUs 31, or transmits data read out from the LUs 31, to the CHN 21A or CHA 21C. Each DKA 22 converts the logical address to a physical address, when it inputs data to or outputs data from an LU 31.

The cache memory (hereinafter, referred to also as "CM") 24 is, for example, a volatile or non-volatile memory, which temporarily stores data received from the host terminals 10 and data read out from the LUs 31, described hereinafter.

The shared memory (hereinafter, also referred to as "SM") 25 is, for example, a non-volatile shared memory, which stores control information relating to the data exchanged with the host terminals (for example, information indicating which of the cache regions reserved on the CM 24, the data is to be stored in), and the like. Moreover, the shared memory 25, as well as being established as a work region (for example, a region for temporarily storing messages exchanged between the CPUs of the respective CHNs 21A and DKAs 22), also stores various data, such as an LU management table 903, CHN relationship management data 901 and LU nexus definition data 905, and the like.

The connecting section 26 provides a mutual connection between the respective CHNs 21A, the respective DKAs 22, the cache memory 24 and the shared memory 25. The connecting section 26 may be constituted by a high-speed bus, such as an ultra-high-speed crossbar switch, or the like, which performs data transfer by means of a high-speed switching operation.

The disk unit 30 comprises a plurality of disk storage devices 400 arranged in an array fashion. For the disk storage devices 400, it is possible to use, for example, devices such a hard disk, flexible disk, magnetic tape, semiconductor memory, optical disk, or the like. A plurality of logical units (hereinafter, abbreviated as "LU") 31, which are logical storage devices, are provided in the storage region of each disk storage device 400. Each LU 31 may also store file metadata relating to the data stored in that LU. The attribute information relating to each file stored in that LU 31 (for example, the file name, storage destination address, or the like) is registered in the file metadata of each LU 31.

The SVP 23 is an information processing terminals for maintaining or managing the storage control system 600 (for example, a notebook-type personal computer). The SVP 23 is connected to the processors in the respective CHNs 21A and the respective DKAs 22 (for example, the I/O processors thereof as described hereinafter), via an internal LAN 410, for example. The SVP 23 is able to monitor the occurrence of problems in the storage control system 600, displaying same on a display screen, and is used to instruct shut off processing, and the like, relating to the disk storage device 400.

Figure 3:
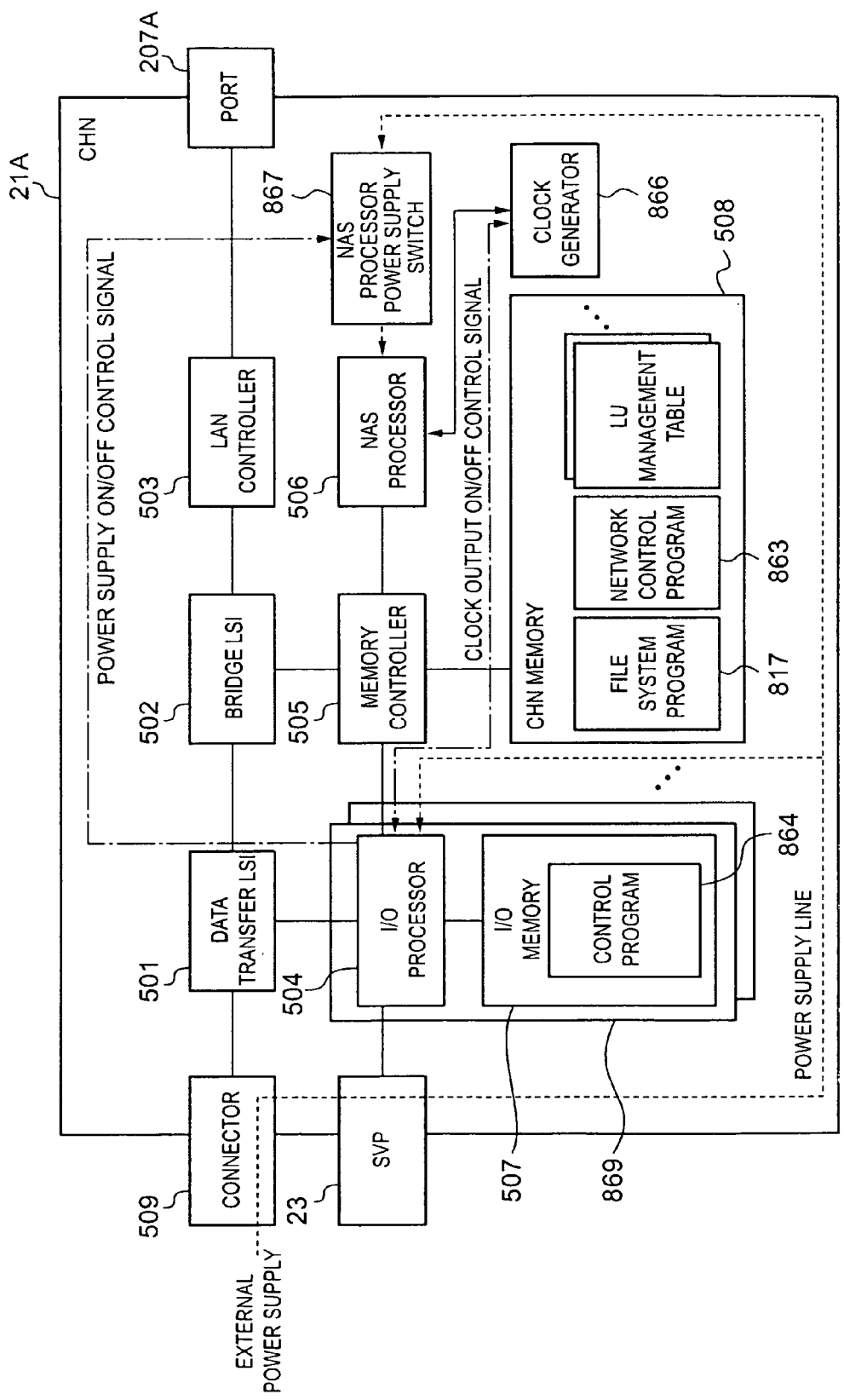
FIG. 3 is a block diagram showing an example of the composition of a CHN 21A.

FIG. 3 is a block diagram showing an example of the composition of a CHN 21A.

The CHN 21A comprises a communications port 207A, a LAN controller 503, a data transfer LSI 501, a bridge LSI 502, one or a plurality of input/output control sections 510 comprising an I/O processor 504 and an I/O memory 869, a memory controller 505, a NAS processor 506, a CHN memory 508 and a connector 509.

The LAN controller 503 controls the communications port 207A in accordance with instructions received from the NAS processor 506 via the memory controller 505 and the bridge LSI. The LAN controller 503 controls transmission and reception of file I/O commands in accordance with a TCP/IP protocol, for example.

The bridge LSI 502 is, for example, a LSI (Large-Scale Integrated circuit) for enabling mutual communications between the LAN controller 503, the memory controller 505 and the data transfer LSI 501.

The memory controller 505 is an LSI for controlling communications between the NAS processor 506 and the CHN memory 508. The memory controller 505 is connected to the NAS processor 506, the CHN memory 508 and the bridge LSI 502.

The CHN memory 508 is able to store programs for controlling the NAS processor 506, and data for exchange between the CM 24 and the host terminal 10A, and the like. The CHN memory 508 is able, for example, to store the file system program 817, the network control program 818, and the like. The file system program 817 is, for example, a program for managing the association between the file name contained in a file I/O command and the address information of the location at which the file having that file name is stored (for example, the LUN and header logical block address), and converting the file I/O command to a block I/O command on the basis of this association. The network control program 818 is, for example, constituted by comprising two file system protocols, such as NFS (Network File System) and Samba. NFS accepts file I/O commands from a host terminal installed with a UNIX (registered tradename) operating system running NFS. Samba, on the other hand, accepts file I/O commands from a host terminal installed with a Windows (registered tradename) operating system running CIFS (Common Interface File System). A block is the management unit for data in the storage region in the disk storage device 400.

Moreover, the CHN memory 508 stores one or more LU management table 903 corresponding to the ID of an LU group which can be accessed by the CHN 21A in which this CHN memory 508 is installed. This one or more LU management table 903 can be acquired selectively, by the I/O processor 504, for example, from a plurality of LU management tables 903 registered in the shared memory 25.

The NAS processor 506 is a CPU or a microprocessor. The NAS processor 506 has, for example, higher functionality than the I/O processor 504 (for example, it has a faster computational processing speed and higher operating clock frequency), but it also has high power consumption. The NAS processor 506 is connected to the memory controller 505. The NAS processor 506 is able to read out the file system program 817 and the network control program 818, and the like, stored in the CHN memory 508, and execute processing in accordance with the computer programs is thus read out. The NAS processor 506, for example, accepts file I/O commands from the host terminal 10A, by means of the network control program 818. Furthermore, by means of the file system program 817, the NAS processor 506 converts the file I/O command received from the host terminal 10A and stored in the CHN memory 508, into a block I/O command, which it outputs to the I/O processor 504.

The I/O processor 504 is a CPU or microcomputer, which is able to exchange data with the connecting section 26, interrupt data communications between the NAS processor 506 and the connecting section 26, and execute various other types of processing described hereinafter, in accordance with a control program 864 read out from the I/O memory 507. Moreover, the I/O processor 504 is able to communicate with the SVP 23.

The I/O memory 507 stores a computer program, and the like, for controlling the I/O processor 504.

The data transfer LSI 501 is an LSI, which is connected to a connector 510 of the connecting section 26, and to the I/O processor 504 and the bridge LSI 502, and it controls the transfer of data.

In this CHN 21A, the I/O processor 504 controls the power on and power off states of the NAS processor 506. Various methods are conceived as power control methods for the NAS processor 506, but in the present embodiment, for example, the I/O processor 504 is able to control same by means of power control method (1) or (2) described below.

(1) A power switch (for example, a transistor) 867 for switching the power supply to the NAS processor 506 on or off is provided on the upstream side of the NAS processor 506, on the power supply line 865 of the NAS processor 506. The power switch 867 receives a power on/off control signal for switching the power supply to the NAS processor 506 on or off, from the I/O processor 504, and it switches the power supply to the NAS processor 506, on or off, in accordance with this power on/off control signal.

(2) A clock generator 866, which outputs a clock of a prescribed frequency to the NAS processor 506, receives a clock output on/off control signal indicating permission or refusal to output a clock signal, from the I/O processor 504, and the power supply to the NAS processor 506 is switched on or off by means of the output of the clock signal being switched on and off in accordance with a power on/off control signal.

Figure 4:
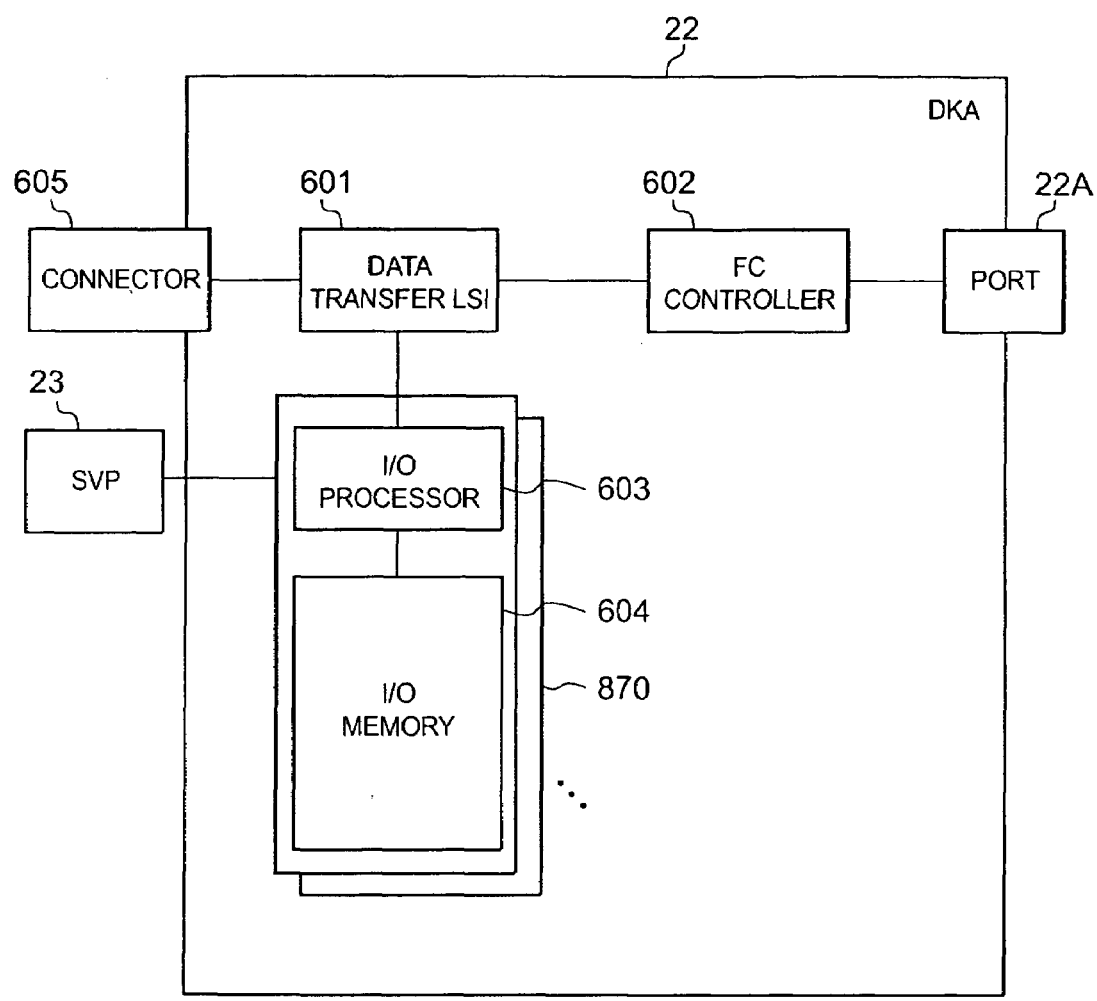
FIG. 4 is a block diagram showing an example of the composition of the DKA 22.

FIG. 4 is a block diagram showing an example of the composition of the DKA 22.

The DKA 22 comprises a communications port 22A, an FC controller 602, a data transfer LSI 601, one or a plurality of input/output control sections 870 comprising an I/O processor 603 and an I/O memory 604, and a connector 605.

The communications port 22A is a port for conducting communications with the disk type storage device 400, via a communications network (for example, a fiber channel), which is not illustrated.

The FC controller 602 is disposed inbetween the communications port 22A and the data transfer LSI 601. The FC controller 602 controls the transmission and reception of block level data, in accordance with a fiber channel protocol, for example.

The I/O memory 604 is used to store programs for controlling the I/O processor 603.

The I/O processor 603 is a CPU or microprocessor. The I/O processor 603 is connected to the data transfer LSI 610, the I/O memory 604, and the SVP 23, and it read in various computer programs contained in the I/O memory 604 and controls the transmission and reception of data and commands.

The data transfer LSI 601 is an LSI, which is connected to a connector 605 in turn connected to the connecting section 26, and to the I/O processor 603 and FC controller 602, and it controls the transfer of data.

Below, the principal parts of the present embodiment shall be described in more detail.

Figure 5:
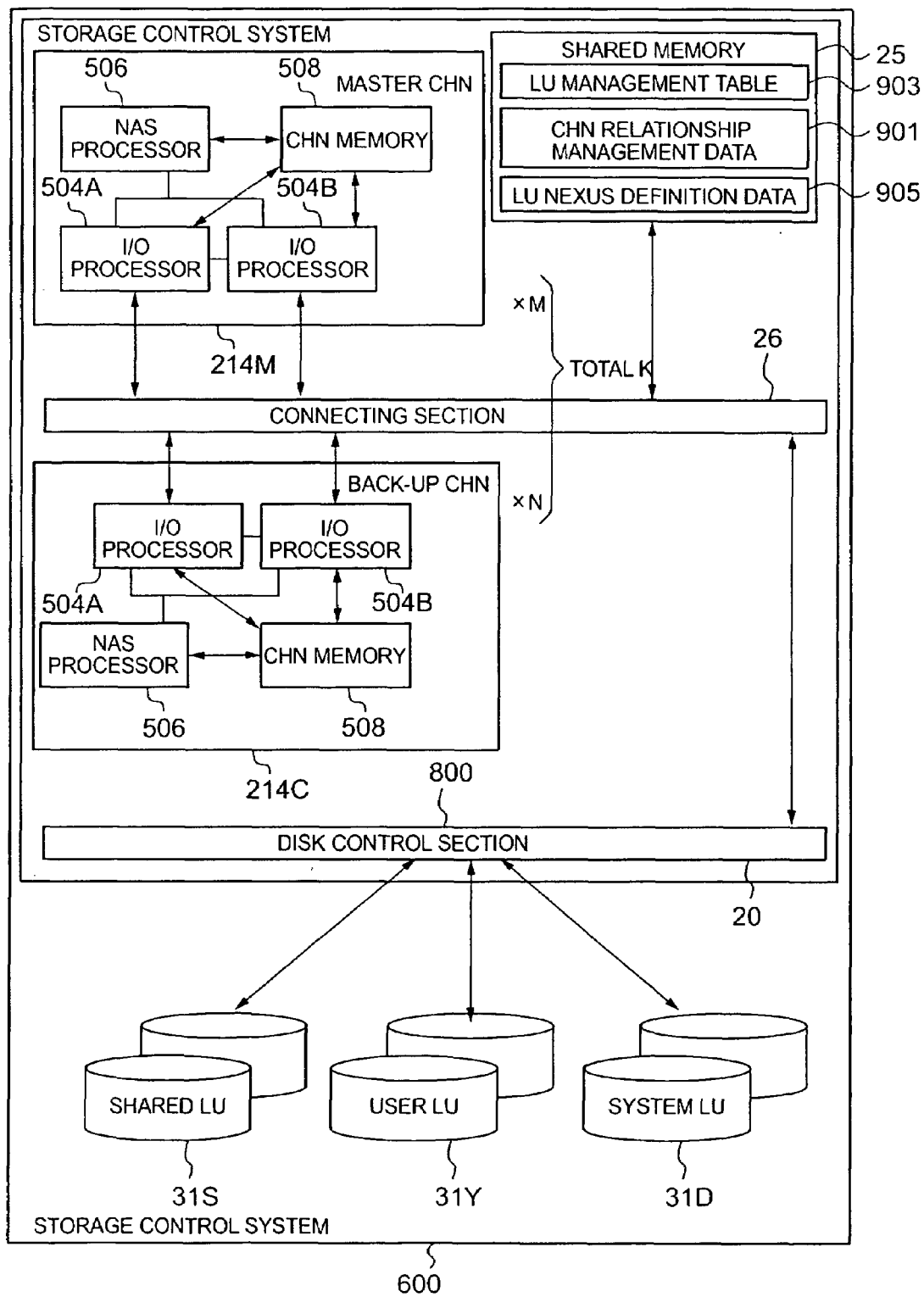
FIG. 5 is a block diagram of a storage control system 600 for describing in detail the principal parts of the present embodiment.

FIG. 5 is a block diagram of a storage control system 600 for describing in detail the principal parts of the present embodiment.

In the CHNs 21A, numbering K (where K≧2), provided in the storage control system 600, I/O processors 504A and 504B forming a dual-layer structure (a multiple-layer structure besides a dual-layer structure may also be used) are connected to a single NAS processor 506. The I/O processors 504A and 504B forming a dual layer are mutually connected. Thereby, if a fault occurs in one of the I/O processors 504A, the other I/O processor 504B detects the fault and operates in place of the I/O processor 504A, thereby allowing the functions of the CHN 21A to be sustained.

Moreover, the CHNs 21A numbering K contain: master CHNs 21AM numbering M (where M≧1) and back-up CHNs 21AC numbering N (where N≧1 and K-M), in a cold standby state. M and N may have the same value or they may have different values. In other words, any of the following situations is possible: M=N, M>N, M<N.

A master CHN 21AM is a CHN in a state of normal operation as a CHN 21A (for example, a CHN which receives a file I/O command and carries out processing for converting same to a block I/O command and outputting same to the connecting section 26). Therefore, in a master CHN 21AM, both the NAS processor 506 and the I/O processors 504A; 504B are in a powered state (a state where the power supply switched on).

On the other hand, a back-up CHN 21AC in a cold standby state assumes a standby state rather than a state of normal operation as a CHN 21A, and whereas the I/O processors 504A, 504B are in a powered state, the NAS processor 506 does not assume a powered state (in other words, it assumes a non-power-consuming state in which the power supply to same is switched off).

The plurality of LUs 31 include a shared LU 31S, a user LU 31Y and a system LU 31D.

A shared LU 31S is an LU which is accessed by both the M master CHNs 21AM and the N back-up CHNs 21AC, via the disk control section 800. Information required in order for each of the CHNs 21A to operate is stored in the shared LU 31S. More specifically, continuation information between respective CHNs 21A is stored in the shared LU 31S, for example. Continuation information is system management information required in order for a back-up CHN 21AC to operate as a master CHN 21AM, for example, information including the IP address of the master CHN 21AM.

The user LU 31Y is an LU in which data is stored by means of a host terminal 10A reading or writing data.

Information required in order for each of the CHNs 21A to operate is stored in the system LU 31D. More specifically, for example, an OS (operating system) image of the NAS processor 506 is stored in the system LU 31D.

As described above, the LU management table 903, CHN relationship management data 901 and LU nexus definition data 905 are stored in the shared memory 25.

FIG. 6 shows an example of the composition of the LU management table 903.

The LU management table 903 is prepared for each LU-GID. An "LU-GID" means the group ID of a LU, and this indicates identification information for a single LU group to which a plurality of LUs belong.

In each LU management table 903, the LUN (Logical Unit Number), and LU status, and the like, are registered for each LU belonging to the LU-GID to which that LU management table 903 corresponds. The LUN for each LU is identification information (hereinafter, called an "ID") for identifying that LU. The status of each LU indicates, for example, whether or not it is in a locked state (in other words, a state of exclusion processing).

FIG. 7 shows an example of the composition of the CHN relationship management data 901.

The CHN relationship management data 901 includes the attributes relating to each of a plurality of CHNs 21A, and information indicating which back-up CHN 21AC substitutes which master CHA 21AM. More specifically, the CHN relationship management data 901 contains note management data 901A, node correspondence data 901B (here, reference to "node" means a CHN 21A).

A plurality of attribute information elements corresponding to the respective plurality of CHAs 21A are contained in the node management data 901A. The attribute information for each CHA 21A includes the blade ID, node name information, category information, status information and an LU-GID. The blade ID is the ID of the CHA 21A corresponding to same (in other words, for example, the ID of the connector 10 inserted into the connector 509 of the CHN 21A.) The node name information is information representing the name of the corresponding CHA 21A. The category information is information indicating whether the corresponding CHA 21 is a master CHA 21AM or a back-up CHA 21AC. The status information is information representing the name of the corresponding CHA 21A. The LU-GID represents the LU-GID to which the plurality of user LUs 31Y which can be accessed by the corresponding CHA 21A belong (for instance, "None" indicates that no corresponding LU-GID exists).

The node correspondence data 901B is information indicating which of the back-up CHAs 21AC corresponds to which of the master CHAs 21AM. For example, in the node correspondence data 901B, attribute information (for example, a blade ID and node name) for one or more back-up CHN 21AC is registered in association with the attribute information (for example, blade ID and node name) of one or more master CHN 21AM. By adjusting the composition of the node correspondence data 901B, it is possible to adjust the correspondence relationship between the master CHNs 21AM and the back-up CHNs 21AC.

FIG. 8 shows a variation example of the correspondences between the node management data 901A and the node correspondence data 901B.

In the first variation, as shown in FIG. 8(A), one back-up CHN 21AC is associated with one master CHN 21AM, by associating the attribute information for one back-up CHN 21AC with the attribute information for one master CHN 21AM.

In the second variation, as shown in FIG. 8(B), a plurality of back-up CHNs 21AC are associated with one master CHN 21AM, by associating the attribute information for a plurality of back-up CHNs 21AC with the attribute information for one master CHN 21AM.

In the third variation, as shown in FIG. 8(C), a plurality of master CHNs 21AM are associated with one back-up CHN 21AC, by associating the attribute information for a plurality of master CHNs 21AM with the attribute information for one back-up CHN 21AC.

In a fourth variation, as shown in FIG. 8(D), a plurality of back-up CHNs 21AC are associated with one master CHN 21AM, by associating the attribute information for a plurality of back-up CHNs 21AC with the attribute information for one master CHN 21AM, and two or more master CHNs 21AM are associated with one back-up CHN 21AC, by associating the attribute information for two or more master CHNs 21AM with the attribute information for one back-up CHN 21AC.

In this second to fourth variation, it is also possible to associate the same back-up CHN 21AC with each of a plurality of master CHNs 21AM, and it is also possible to associate the same master CHN 21AM with each of a plurality of back-up CHNs 21AC.

FIG. 9 shows an example of the composition of LU nexus definition data 905.

The LU nexus definition data 905 contains information registered for each master CHN 21AM and back-up CHN 21AC, such as one or more LU-GID that is associable with same, one or more LUNs belonging to each LU-GID, and information indicating the type of the plurality of LUs belonging to each LU-GID (for example, whether they are system LUs or user LUs). By referring to this LU nexus definition data 905 and the aforementioned CHN relationship management data 901, it is possible to identify which LU-GIDs of the one or more LU-GIDs that associable with each one of the master CHNs 21AM and back-up CHNs 21AC, has not yet been associated. The LU mapping processing based on this LU nexus definition data 905 is described hereinafter.

In a normal state (in other words, in a case where no problem has occurred in the master CHN 21A), a master CHN 21AM reads a file from a user LU 31Y, or it writes a file to a user LU 31Y, on the basis of a file I/O command from a host terminal 10A, and it writes continuation information to the shared LU 31S. On the other hand, the back-up CHNs 21AC monitor the status information written to the shared memory 25. Below, various processing sequences are described. In the following description, a NAS processor installed in a master CHN 21AM is referred to as a "master NAS processor", and an I/O processor therein is referred to as a "master I/O processor", whereas a NAS processor installed in a back-up CHN 21AC which is in a cold standby state is referred to as a "cold NAS processor" and the I/O processor therein is referred to as a cold I/O processor".

Figure 10:
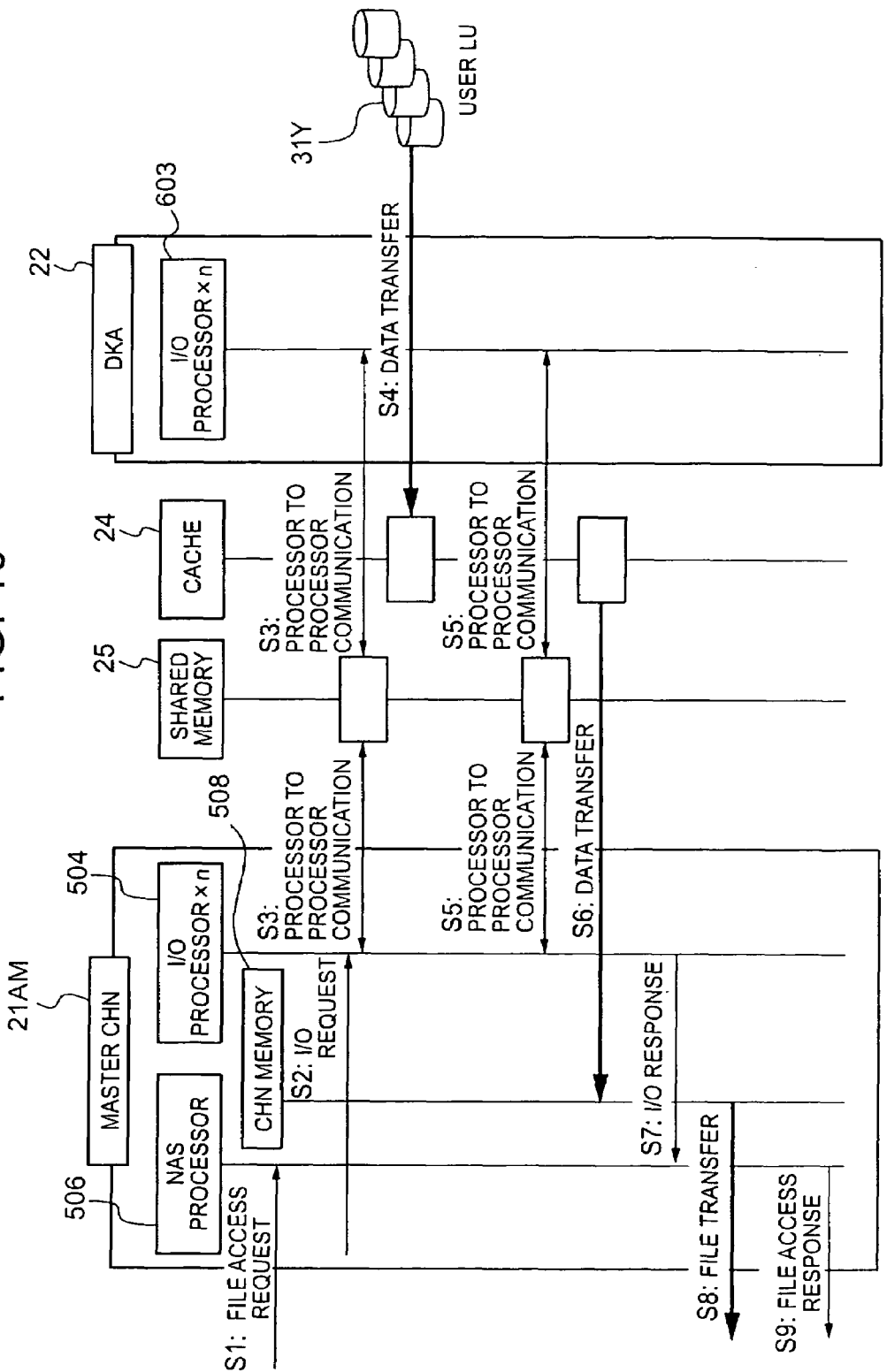
FIG. 10 shows one example of the sequence of file read processing carried out by an master CHN 21AM.

FIG. 10 shows one example of the sequence of file read processing carried out by a master CHN 21AM.

The master NAS processor 506 receives a file I/O command indicating a read request (in other words, a file access request) from a host terminal 10A (step S1). The master NAS processor 506 converts that file I/O command to a block I/O command, and outputs the block I/O command to one of the dual-layered master I/O processors 504A, 504B (or to both thereof) (S2).

The master I/O processor (for example 504A) having received this block I/O command from the NAS memory 506 outputs a file read message requesting read out of the data file existing at the address information (for example, the LUN and logical block address) contained in the block I/O command, via the shared memory 25, to the master I/O processor 603 of the DKA 22 capable of accessing the address information contained in that block I/O command (S3).

The master I/O processor 603 of a DKA 22 having receiving a file read out message reads out the data file from the location indicated by the address information specified by the data read out message (a location in the user LU 31Y) and stores that data file in the cache memory 24 (S4). The master I/O processor 603 then outputs a read out completion message indicating that read out of the data file has been completed, to the master I/O processor 504A of the master CHN 21AM, via the shared memory 25 (S5).

The master I/O processor 504A having received this read out completion message reads out the data file from the cache memory 24, stores same in the CHN memory 508 (S6), and outputs an I/O response to the master NAS processor 506 (S7).

The master NAS processor 506 receiving this I/O response reads out the data file from the CHN memory 508, transfers that data file to the host terminal 10A which originated the file access request (S8), and outputs a file access response to that host terminal 10A (S9).

Figure 11:
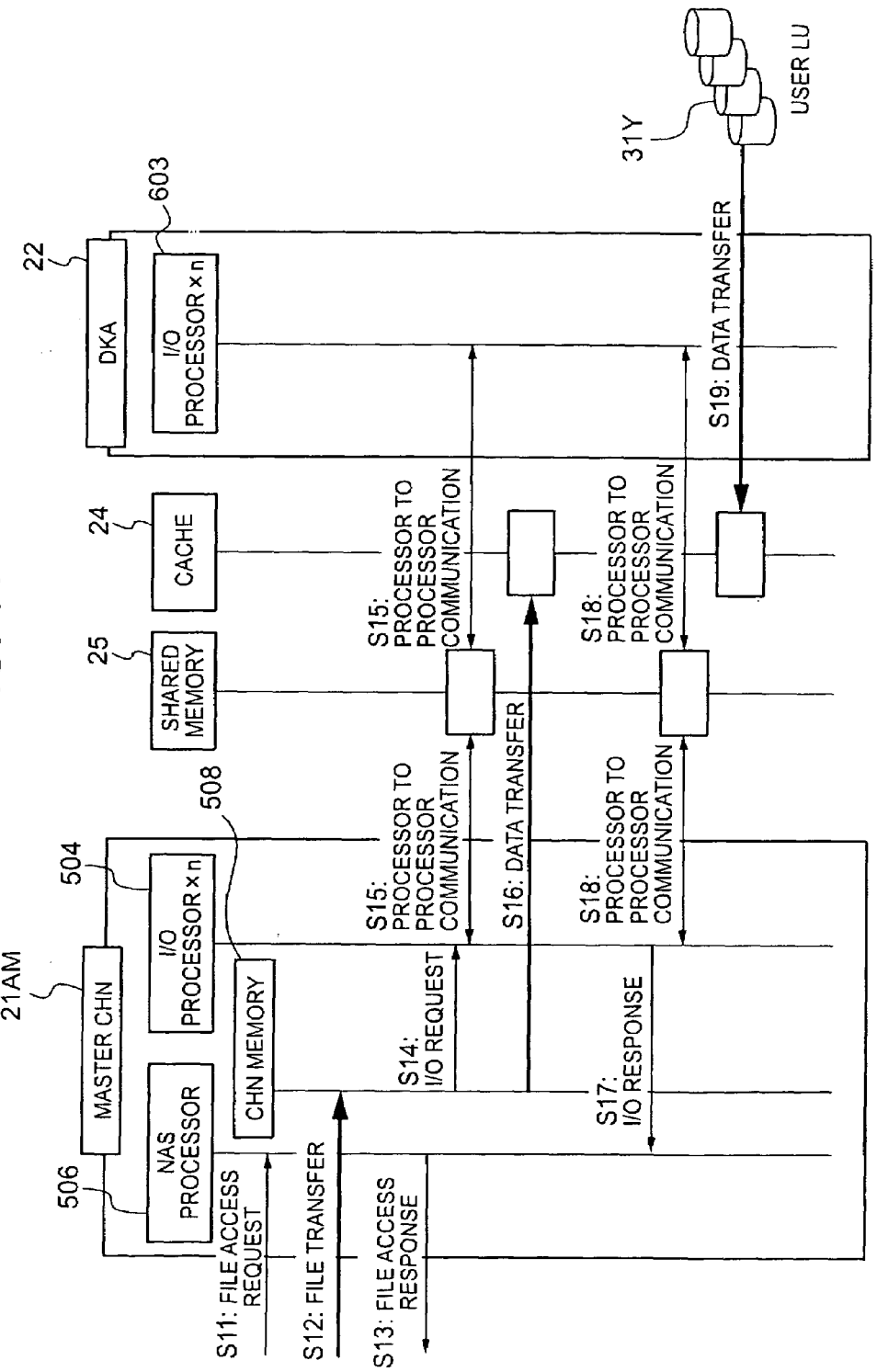
FIG. 11 shows one example of the sequence of file write processing carried out by an master CHN 21AM.

FIG. 11 shows one example of the sequence of file write processing carried out by a master CHN 21AM.

The master NAS processor 506 receives a file I/O command indicating a write request, from a host terminal 10A (S11), and writes the file to be written, which is contained in the file I/O command, to the NAS memory 508 (S12). The master NAS processor 506 then sends a file access response to the host terminal 10A (S13), and also converts the file I/O command received at S11 to a block I/O command, and outputs this block I/O command to one of the dual layered master I/O processors 504A, 504B (or to both thereof) (S14).

The master I/O processor (for example 504A) having received this block I/O command from the NAS memory 506 outputs a file write message requesting writing of the file to be written, at the address information contained in the block I/O command, via the shared memory 25, to the master I/O processor 603 of the DKA 22 capable of accessing the address information contained in that block I/O command (S15). Moreover, the master I/O processor 504A writes the file to be written, which is held in the CHN memory 508, to the cache memory 24 (S16), and sends an I/O response to the master NAS processor 506 (S17). The master I/O processor 504A then outputs a write completion message indicating that writing of the data file has been completed, to the master I/O processor 603 of the DKA 22, via the shared memory 25 (S18).

The master I/O processor 603 of the DKA 22 having received the file write message or write completion message acquires the file to be written, from the cache memory 24, and stores that file to be written, at the location indicated by the address information specified by the file write message (a location in the user LU 31Y) (S19).

Figure 12:
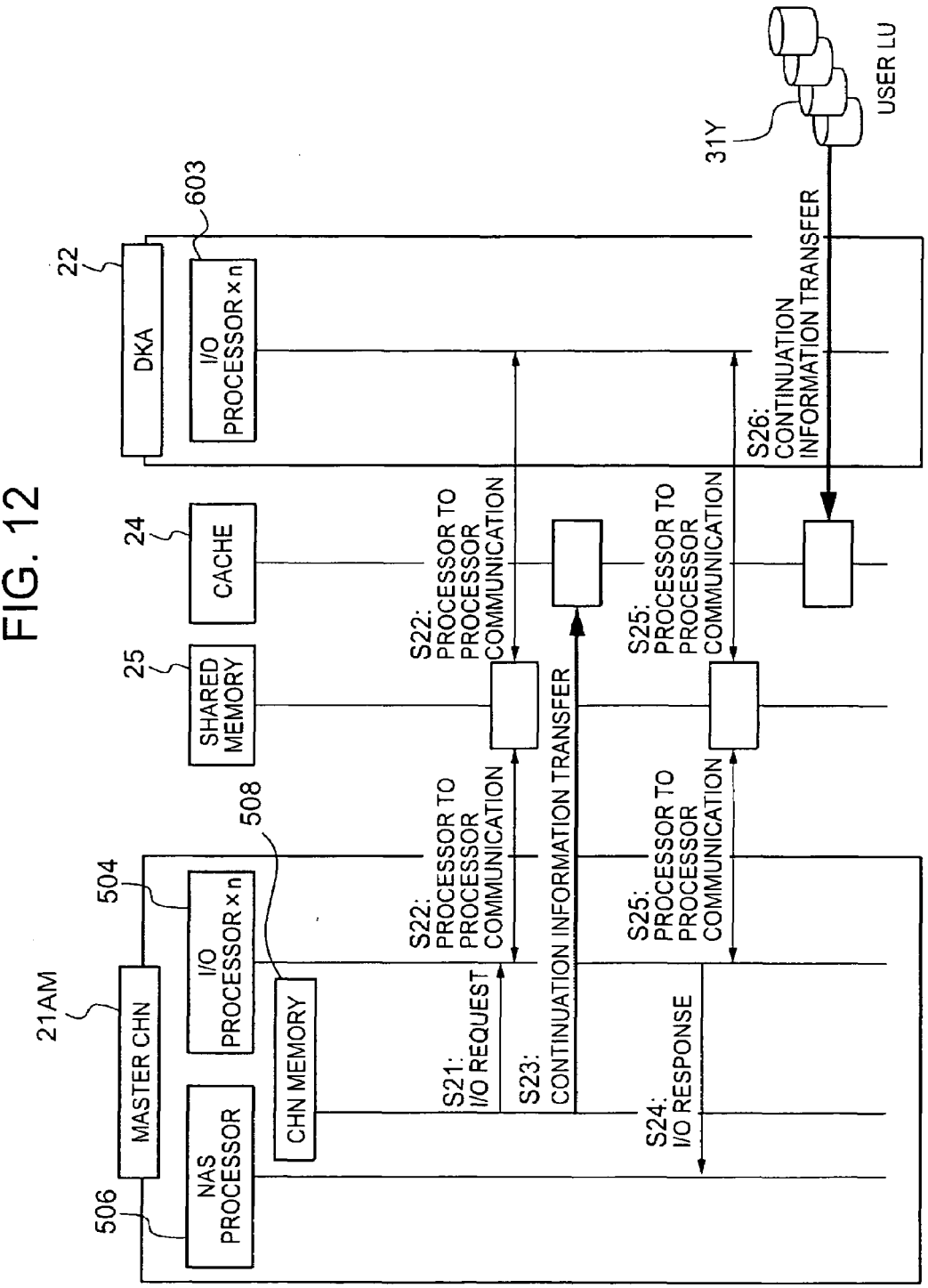
FIG. 12 shows one example of the sequence of continuation information write processing carried out by a master CHN 21AM.

FIG. 12 shows one example of the sequence of continuation information write processing carried out by a master CHN 21AM.

The continuation information (in other words, system management information) used by the master CHN 21AM is stored in the CHN memory 508.

The master NAS processor 506 outputs a block I/O command indicating a request for writing of continuation information, to one (or both) of the dual-layered master I/O processors 504A, 504B (S21).

The master I/O processor (for example 504A) having received this block I/O command from the NAS memory 506 outputs a write message requesting writing of the continuation information, at the address information contained in the block I/O command, via the shared memory 25, to the master I/O processor 603 of the DKA 22 capable of accessing the address information contained in that block I/O command (S22). Moreover, the master I/O processor 504A writes the continuation information, which is held in the CHN memory 508, to the cache memory 24 (S23), and sends an I/O response to the master NAS processor 506 (S24). The master I/O processor 504A then outputs a write completion message indicating that writing of the continuation information has been completed, to the master I/O processor 603 of the DKA 22, via the shared memory 25 (S25).

The master I/O processor 603 of the DKA 22 having received the write message or write completion message acquires the continuation information, from the cache memory 24, and stores the continuation information, at the location indicated by the address information specified by the file write message (a location in the shared LU 31S) (S26).

Figure 13:
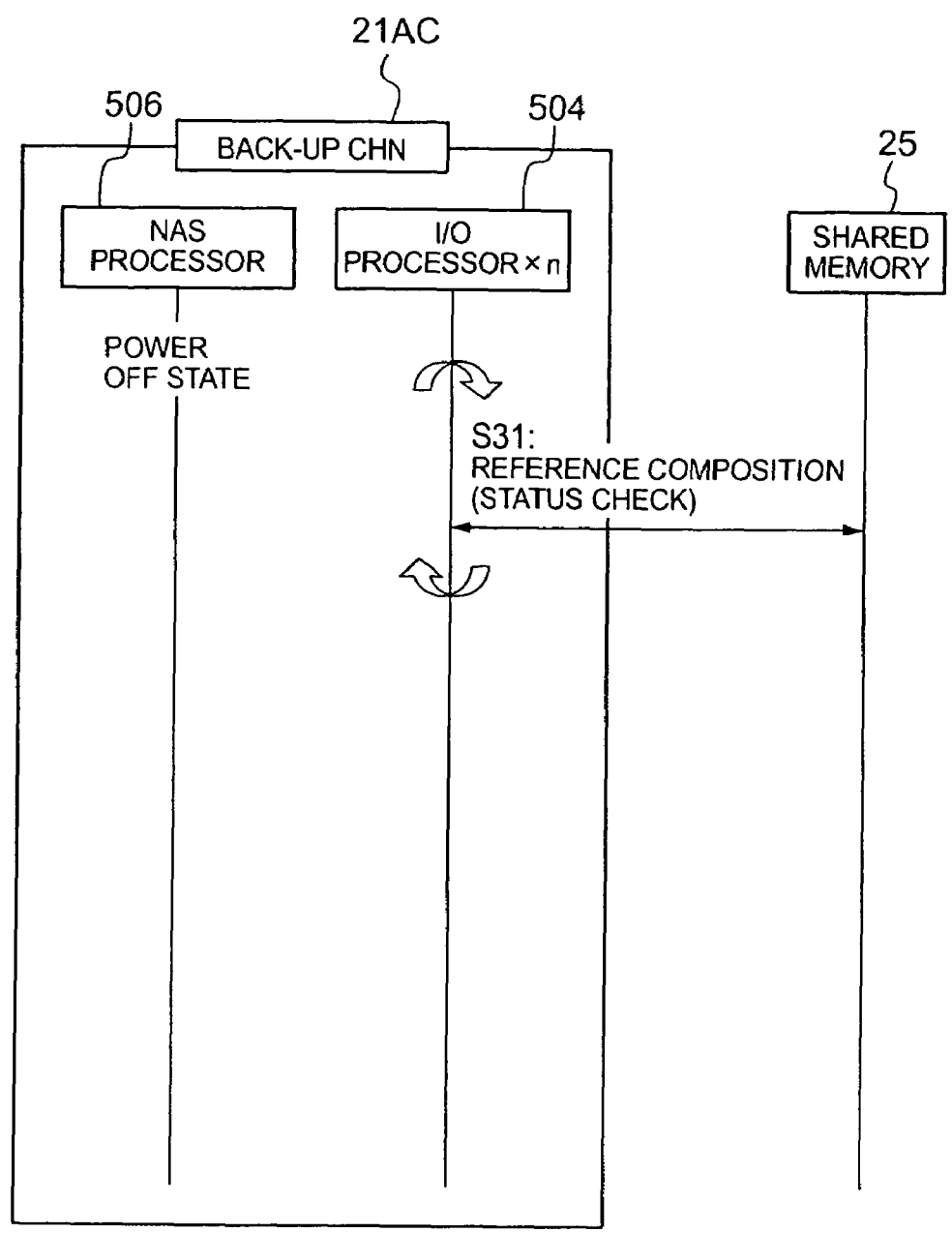
FIG. 13 shows the sequence of normal processing carried out by a back-up CHN 21AC.

FIG. 13 shows the sequence of normal processing carried out by a back-up CHN 21AC.

In the back-up CHN 21AC, since the CHN adopts a cold standby state, as described above, the power supply of the cold NAS processor 506 assumes an off state, whereas the power supply of the cold I/O processors 504A, 504B assumes an on state. One or both of these cold I/O processors 504A, 504B monitors the status information written to the shared memory 25 (more specifically, the one or more status information elements corresponding to the one or more master CHNs 21AM written to the master management data 901B corresponding to the back-up CHN 21AC in which the I/O processors 504A, B are actually installed), at a prescribed timing (for example, periodically, or occasionally) (S31).

As a result of this monitoring operation, if it is detected that a problem has occurred in at least one of the one or more corresponding master CHNs 21AM, then the back-up CHN 21AC which detected the occurrence of the problem operates as a master CHN 21AM, in the place of the master CHN 21AM in which the problem has occurred.

FIG. 14 shows an overview of the sequence of processing until the back-up CHN 21AC operates as a master CHN 21AM.

Figure 14A:
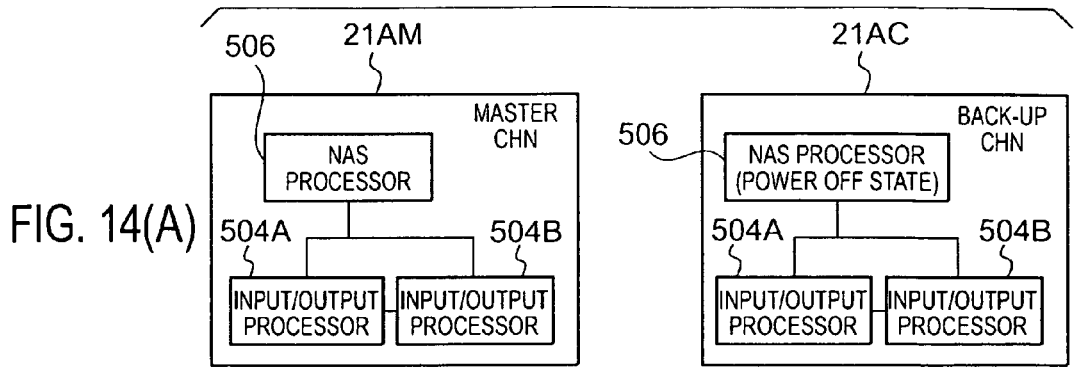
FIG. 14 shows an overview of a processing sequence until a back-up CHN 21AC operates as a master CHN 21AM.

As shown in FIG. 14(A), normally, in a master CHN 21AM, the power supply to the NAS processor is on, whereas in a back-up CHN 21AC, the power supply to the NAS processor is off. In the back-up CHN 21AC, either one or both of the cold I/O processors 504A, 504B having the power supply in an on state monitors the one or more status information elements (status information registered in the node management data 901A) respectively corresponding to the one or more master CHNs 21AM corresponding to that back-up CHN 21AC.

Figure 14B:
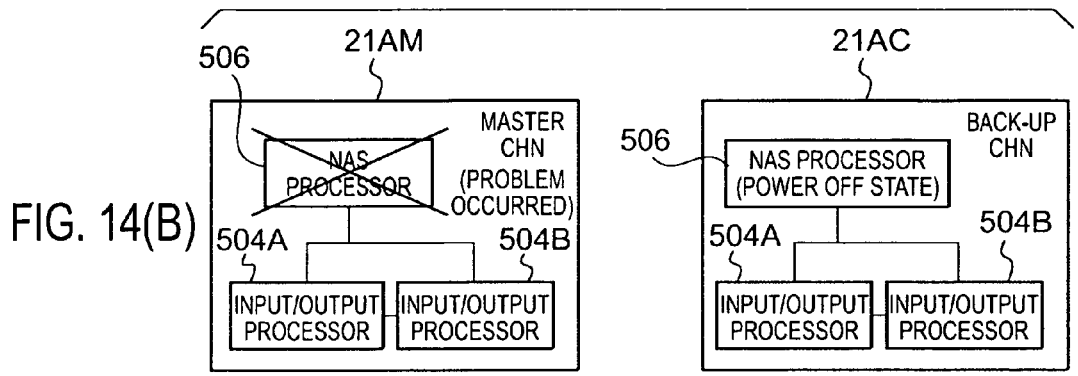
Figure 14C:
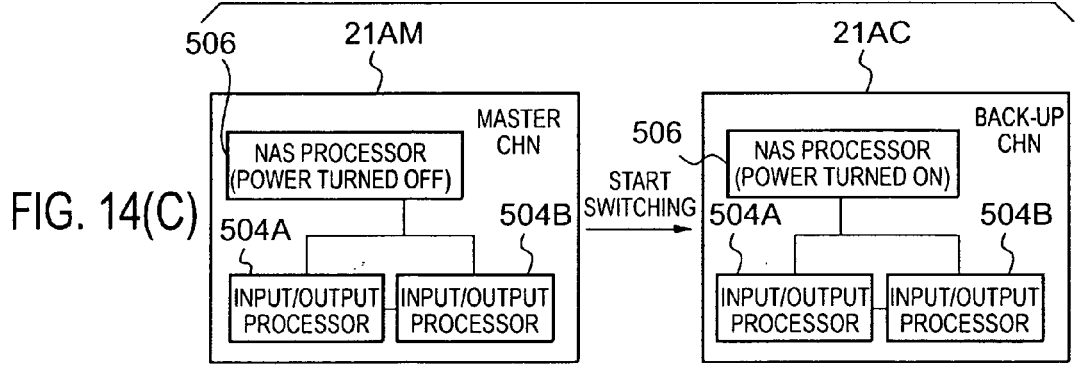

In this state, as shown in FIG. 14(B), if a problem has occurred in the master CHN 21AM, then as shown in FIG. 14(C), at least one of the master I/O processors 504A, 504B sets the power supply of the master NAS processor 506 to an off state, and it also updates the status information corresponding to that master CHN 21AM, as contained in the mode management data 901A in shared memory 25, to status information indicating that a problem has occurred. If one or both of the cold I/O processors 504A, 504B detects that the status information corresponding to at least one of the one or more corresponding master CHNs 21AM has been set to status information indicating the occurrence of a problem, then the power supply of the cold NAS processor 506 is set to an on state.

Figure 14D:
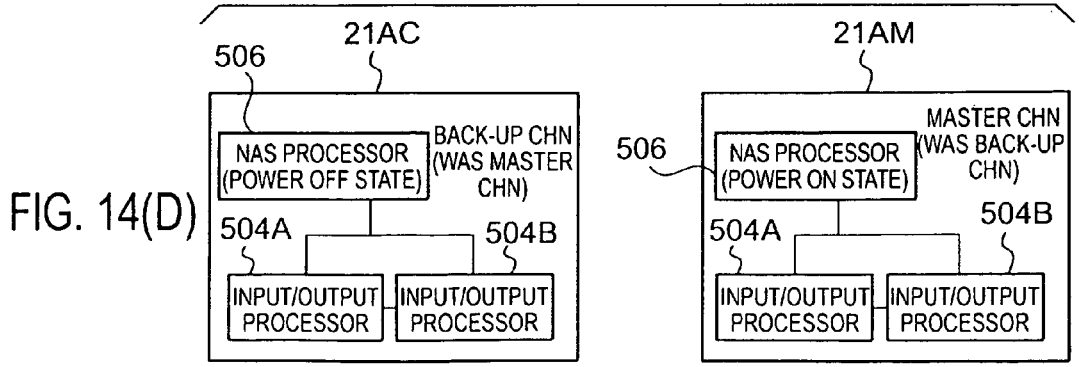

By means of this sequence, as illustrated in FIG. 14(D), the master CHN 21AM is switched to a cold standby state, and the back-up CHN 21AC is set to a state in which it can operate as a master CHN 21AM.

Below, the processing sequence carried out by the back-up CHN 21AC and the master CHN 21AM is described in detail.

Figure 15:
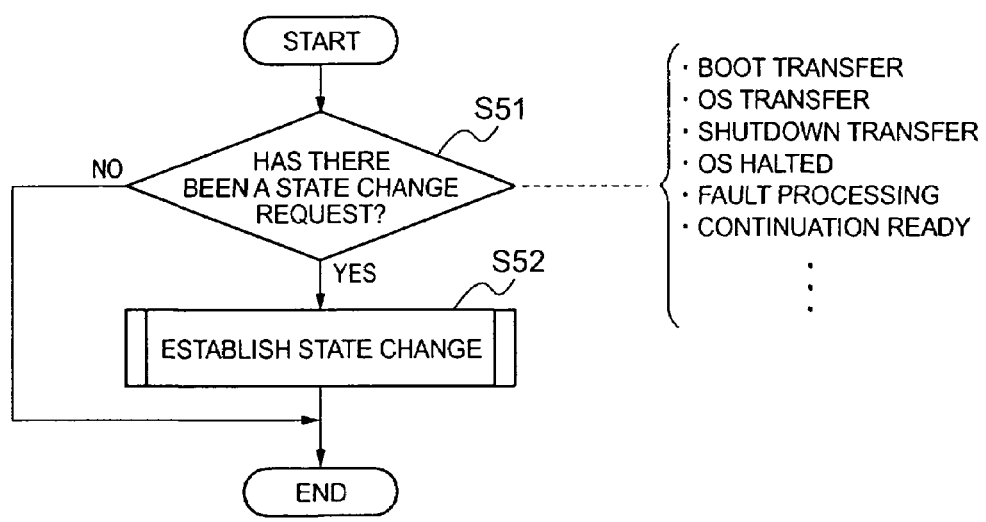
FIG. 15 shows the processing sequence in a case where a master CHN 21AM carries out a judgment of whether or not the status information has been updated.

FIG. 15 shows the processing sequence in a case where the master CHN 21AM carries out a judgment of whether or not the status information has been updated.

The processing sequence in this diagram is started periodically by the master I/O processors 504A, 504B in the master CHN 21AM.

For example, if the master I/O processor 504A has started this processing sequence, and if it is judged that there has been a state change request (No at S51), then the master I/O processor 504A carries out state change setting processing for changing the status information (the status information in the node management data 901A) corresponding to the master CHN 21AM in which it is installed (S52). Cases where the judgment is Yes at S51 will correspond to at least one of, for example, boot transfer (a case where the OS image of the master NAS processor 506 is being read out), OS operation (a case where the OS of the master NAS processor 506 is being run), shut down transfer (a case where the power supply of the master NAS processor 506 is being set to an off state), OS halted (a case where the OS of the master NAS processor 506 has been halted), problem processing (a case where the occurrence of a problem in the master CHN 21AM has been detected), and/or continuation Ready (a case where continuation information has been stored in the shared LU 31S).

Below, a case where problem processing is carried out, will be described.

Figure 16:
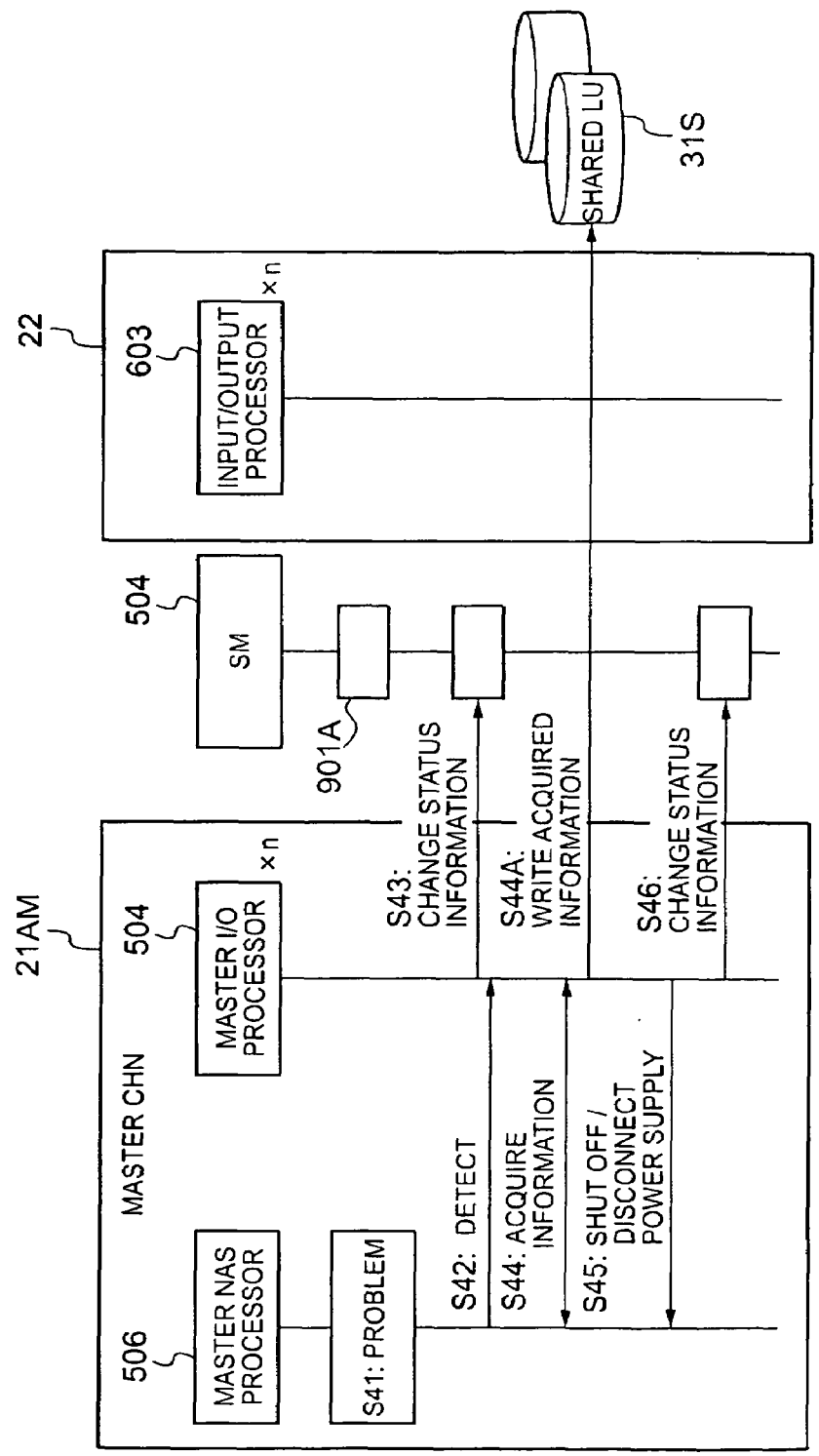
FIG. 16 shows the processing sequence carried out in a case where a problem has occurred in the master NAS processor 506 in a master CHN 21AM.

FIG. 16 shows the processing sequence carried out in a case where a problem has occurred in the master NAS processor 506 in a master CHN 21AM. FIG. 17 shows the sequence of changing the node management data 901A in this processing sequence.

As shown in FIG. 16, if a problem has occurred in the master NAS processor 506 in a master CHN 21AM having a blade ID of "1", for example (S41), then the master I/O processor 504A (and/or 504B) detects that a problem has occurred in the master NAS processor 506 (S42). In this case, the master I/O processor 504A changes the status information corresponding to the master CHN 21AM (blade ID "1") in which it is installed (the status information written to the node management data 901A), from status information indicating an operational state, "Active", to status information indicating that it is dumping, "Dumping", (S43 and FIGS. 17(A) and (B)).

Thereupon, the master I/O processor 504A acquires information on the occurrence of the problem relating to the master NAS processor 506, from the master NAS processor 506 of the NAS memory 508 (S44). Thereupon, the master I/O processor writes the acquired information to the shared LU 31S, via the DKA 22 (S44A).

When this procedure has completed, the master I/O processor 504A shuts off the master NAS processor 506 (halts the operation thereof), and disconnects the power supply to the master NAS processor 506 (S45). Thereafter, the master NAS processor 506 changes the status information corresponding to the master CHN 21AM in which it is installed, from the status information "Dumping" indicating that it is engaged in a dumping operation, to the status information "State Ready" indicating that a problem has occurred, the operation has been interrupted, and a continuable state has been assumed (S46 and FIG. 17(C)).

FIG. 18 shows an example of the processing sequence carried out in a case where a problem has occurred in the master I/O processor 504A in a master CHN 21AM.

Figure 18A:
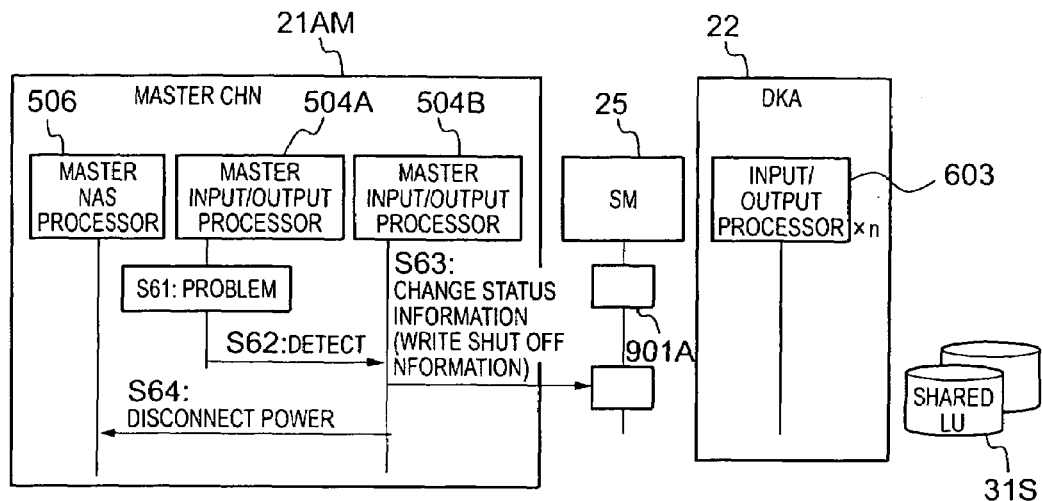
FIG. 18 shows the processing sequence carried out in a case where a problem has occurred in the master I/O processor 504A, in a master CHN 21AM.

As shown in FIG. 18(A), if a problem has occurred in one of the master I/O processors 504A (S61), then the other master I/O processor 504B detects this occurrence (S62), and it changes the status information corresponding to the master CHN 21AM in which it is installed, from the status information "Active" indicating that it is operating, to status information indicating a shut off state (S63). Thereupon, the master I/O processor 504B disconnects the power supply to the master NAS processor 506 (S64).

Figure 18B:
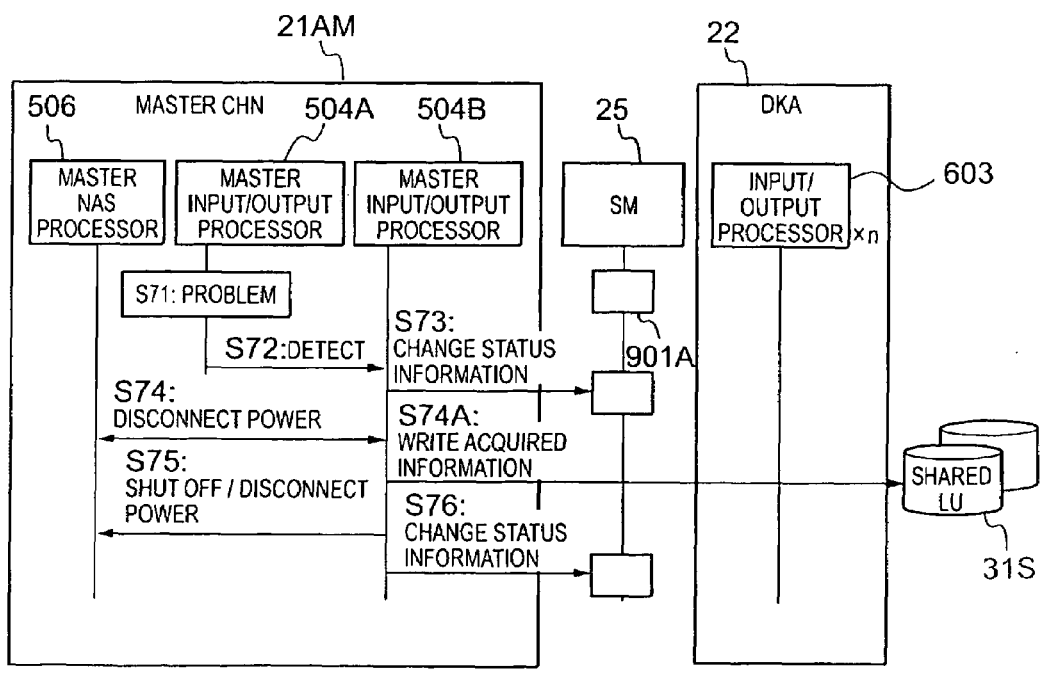

Alternatively, as shown in FIG. 18(B), if a problem has occurred in one of the master I/O processors 504A (S71), then this occurrence is detected by the other master I/O processor 504B (S72). Thereafter, similar processing to that in S43–S46 above is carried out (S74–S76).

In the master CHN 21AM, even if a problem occurs in one of the master I/O processors 504A, if no problem has occurred in the other master I/O processor 504B, then the other master I/O processor 504B is able to sustain the normal state (a state where it carries out normal processing as an I/O processor 504B of the master CHN 21AM), without implementing the processing in FIG. 18(A) or (B). Furthermore, in this case, the other master I/O processor 504B is also able to report that a problem has occurred in one master I/O processor 504A, to the SVP 23, via an internal communications network (for example, a LAN).

Figure 19:
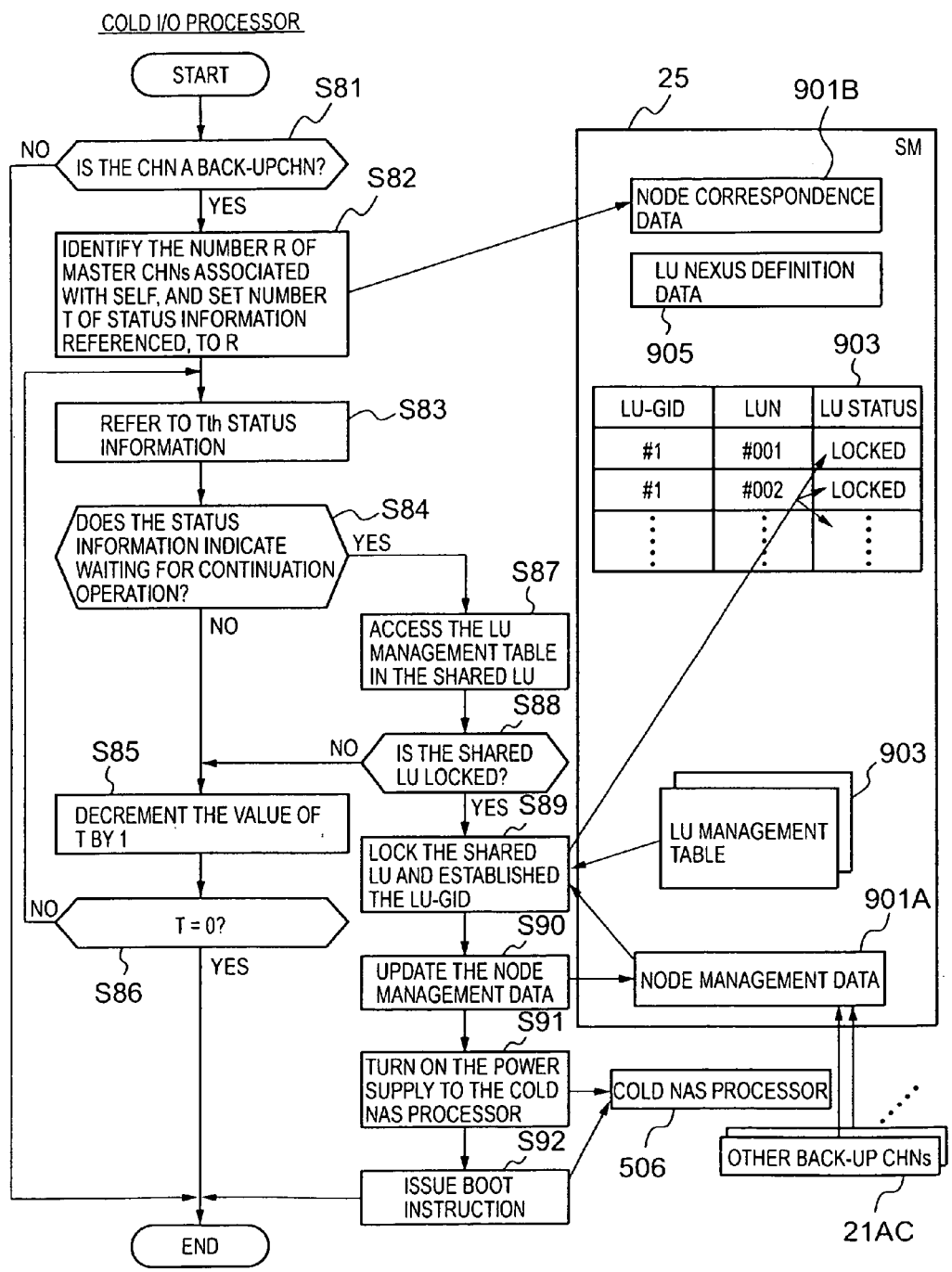
FIG. 19 shows the processing sequence of a cold I/O processor 504A.
Figure 20A:
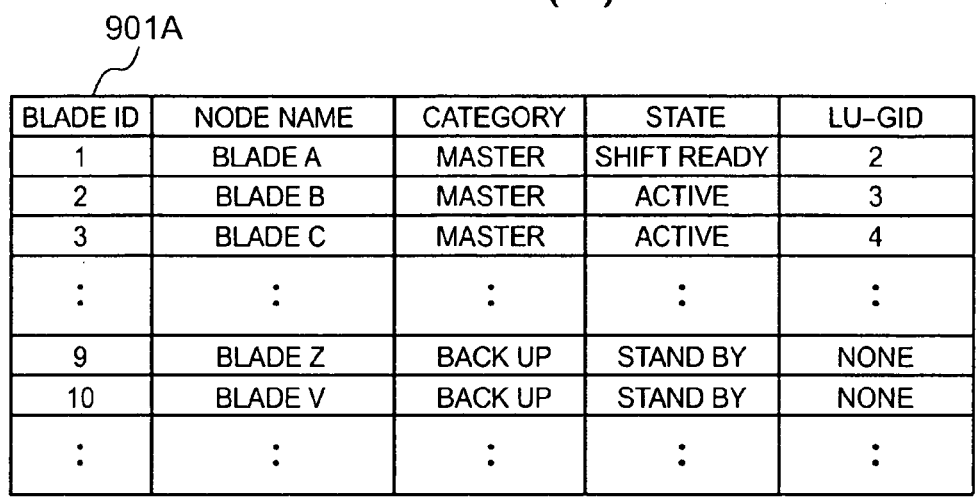
FIG. 20 shows an example of the node management data 901A, before change and after change, in the processing sequence illustrated in FIG. 19.
Figure 20B:
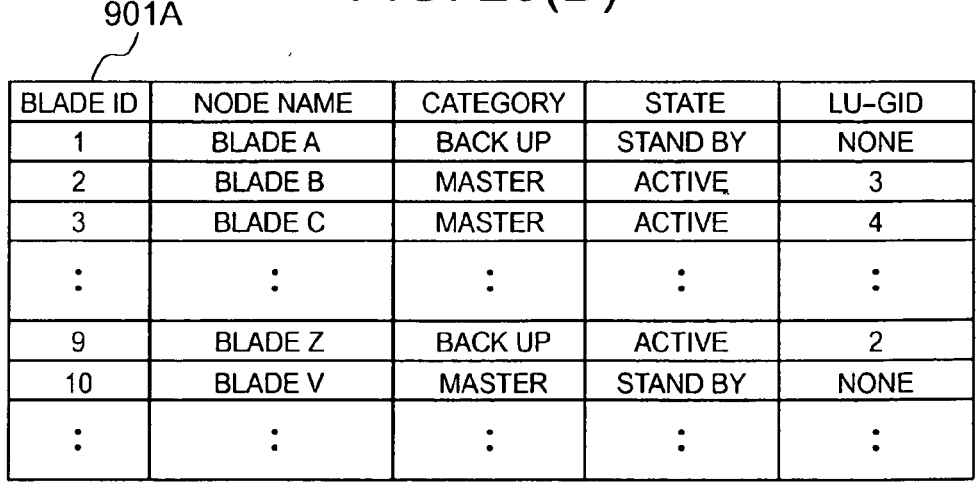

FIG. 19 shows the processing sequence of a cold I/O processor 504A. FIG. 20 shows an example of the node management data 901A, before change and after change, in the processing sequence illustrated in FIG. 19. More specifically, FIG. 20(A) shows node management data 901A before change and FIG. 20(B) shows node management data 901A after change.

The cold I/O processor 504A starts which processing at a prescribed timing, (for example, occasionally or periodically).

The cold I/O processor 504A, for example, accesses the node management data 901A, and judges whether or not the CHN 21A in which it is installed is a back-up CHN 21AC, by means of a method, such as referring to the category information corresponding to that particular CHN 21A (S81).

At S81, if it is judged that the CHN 21A is a back-up CHN 21AC (Y at S81), then the cold I/O processor 504A accesses the node corresponding data 901B, identifies the number R of master CHNs 21AM associated with the CHN 21A in which it is installed, and sets the number T of the status information to which it must refer (in other words, the status information of the associated master CHN 21AM described above), to the number R identified previously (S82).

The cold I/O processor 504A accesses the node management data 901A, and refers to the Tth status information selected from the status information of the one or more master CHNs 21AM associated with the CHN 21AC in which it is installed (S83). As shown in the diagrams, the status information for the one or more master CHNs 21AM in the node management data 901 is referenced at a prescribed timing by the other back-up CHN 21AC, as well.

If, as a result of S83, the reference status information is not the information "Shift Ready" indicating that the CHN is awaiting continuation (N at S84), then the cold I/O processor 504A decrements the value of T by 1 (S85). As a result, when the value of T has become zero, the cold I/O processor 504A terminates the processing, whereas if the value of T is not zero, then it carries out the processing in S83.

In S84, if the referenced status information is the information "Shift Ready" indicating that the CHN is awaiting continuation (Y at S84), then the hold I/O processor 504A starts continuation processing (S87–S92 described below) for the master CHN 21AM corresponding to that status information (hereinafter, called the target master CHN 21AM).

Firstly, the hold I/O processor 504A refers to the LU nexus definition data 905, identifies the LU-GID of the shared LU 31S, accesses the LU management table 903 having the LU-GID thus identified, and checks that the states of the LUs belonging to that LU-GID have all been set to a locked state (in other words, a state in which they cannot be accessed by any other CHN 21A) (S87).

If, as a result of S87, the shared LU 31S has already been set to a locked state by another back-up CHN 21AC, then the cold I/O processor 504A carries out the processing in S85, and terminates the continuation processing for the target master CHN 21AM.

On the other hand, if, as a result of S87, the shared LU 31S is not in a locked state, then the cold I/O processor 504A sets the state of each LU in the LU management table 903 corresponding to the shared LU 31S, to a locked state, and furthermore, it acquires the one or more LU-GIDs corresponding to the target master CHN 21AM, from the node management data 901A, and sets the one or more LU-GIDs thus acquired (S89). More specifically, for example, the cold I/O processor 504A acquires one or more LU management tables 903 corresponding respectively to the one or more LU-GIDs thus acquired, from the SM 25, and it registers same in the CHN memory 508 (in other words, the communications buffer).

Thereupon, the cold I/O processor 504A accesses the node management data 901A, and changes the attribute information corresponding to the back-up CHN 21AC in which it is installed, and the attribute information corresponding to the target master CHN 21AC (S90). More specifically, for example, as illustrated in FIG. 20, the cold I/O processor 504A changes the category information corresponding to the back-up CHN 21AC in which it is installed, from "back up" to "master", and it also changes the status information from "Stand By" to "Active", and the LU-GID, from "None" to "2". Furthermore, the cold I/O processor 504A changes the divisional information corresponding to the target master CHN 21AC, from "master" to "back up", and it also changes the status information from "Active" to "Stand By", and the LU-GID, from "2" to "None".

Thereupon, the cold I/O processor 504A turns on the power supply to the cold NAS processor 506, and issues a boot instruction to the cold NAS processor 506 (S92).

Figure 21:
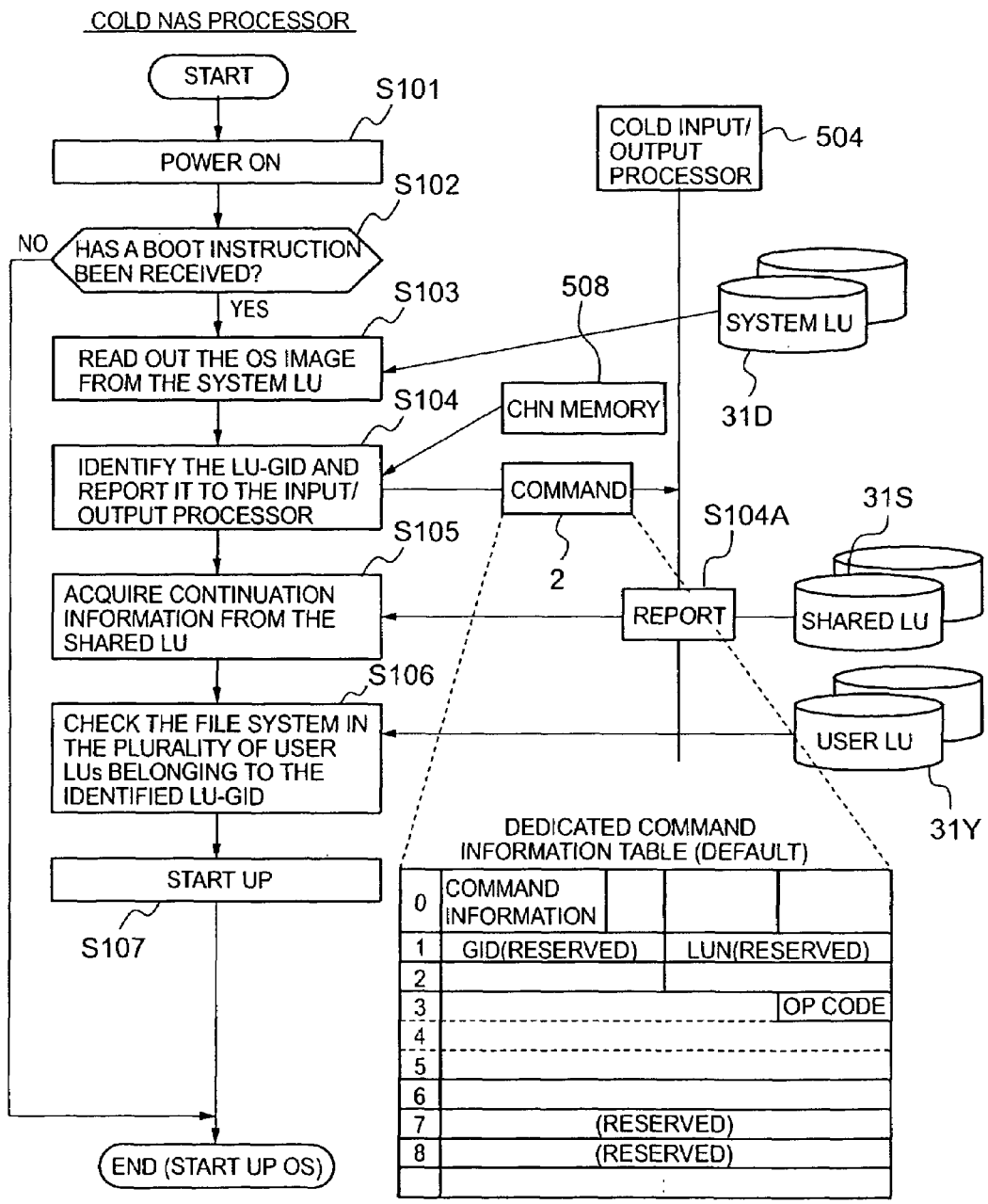
FIG. 21 shows the processing sequence of a cold NAS processor 506.

FIG. 21 shows the processing sequence of a cold NAS processor 506.

After turning off the power supply (S101), if the cold NAS processor 506 receives a boot instruction (Y at S102), then it reads out the OS image from the system LU 31D, via the cold I/O processor 504A or 504B (S103). This system LU 31D can be set, for example, as an LU that is previously determined in relation to that cold NAS processor 506, from the one or more LUs belonging to the LU-GID "0".

The cold NAS processor 506 refers to the LU management table 903 registered in the NAS memory 508, whilst engaged in OS boot processing, and it identifies the LU-GID established for the CHN 21AC in which it is installed, and reports the LU-GID thus identified to the cold I/O processor 504A (or 504B) (S104). More specifically, the cold NAS processor 506 sends the identified LU-GID to the cold I/O processor 504A, by including it in a prescribed command 2. Upon receiving the command 2, the cold I/O processor 504A recognizes the LU-GID associated with the CHN 21AC in which it is installed, on the basis of that command 2 (S104A).

The cold NAS processor 506, whilst engaged in OS boot processing, acquires continuation information from the shared LU 31S, via the cold I/O processor 504A (or 504B) (S105). As and when necessary, during OS boot processing, the cold NAS processor 506 sets information elements selected from amongst the plurality of information elements contained in the acquired continuation information.

During OS boot processing, the cold NAS processor 506 accesses the plurality of user LUs 31Y belonging to the LU-GID identified as described above, by means of the cold I/O processor 504A (or 504B), and it performs a check of the file system which it is managing, and the like, by checking the file metadata in those user LUs 31Y, or the like (S106).

The OS of the cold NAS processor 506 is started up by the processing in S101 to S106 described above.

Figure 22:
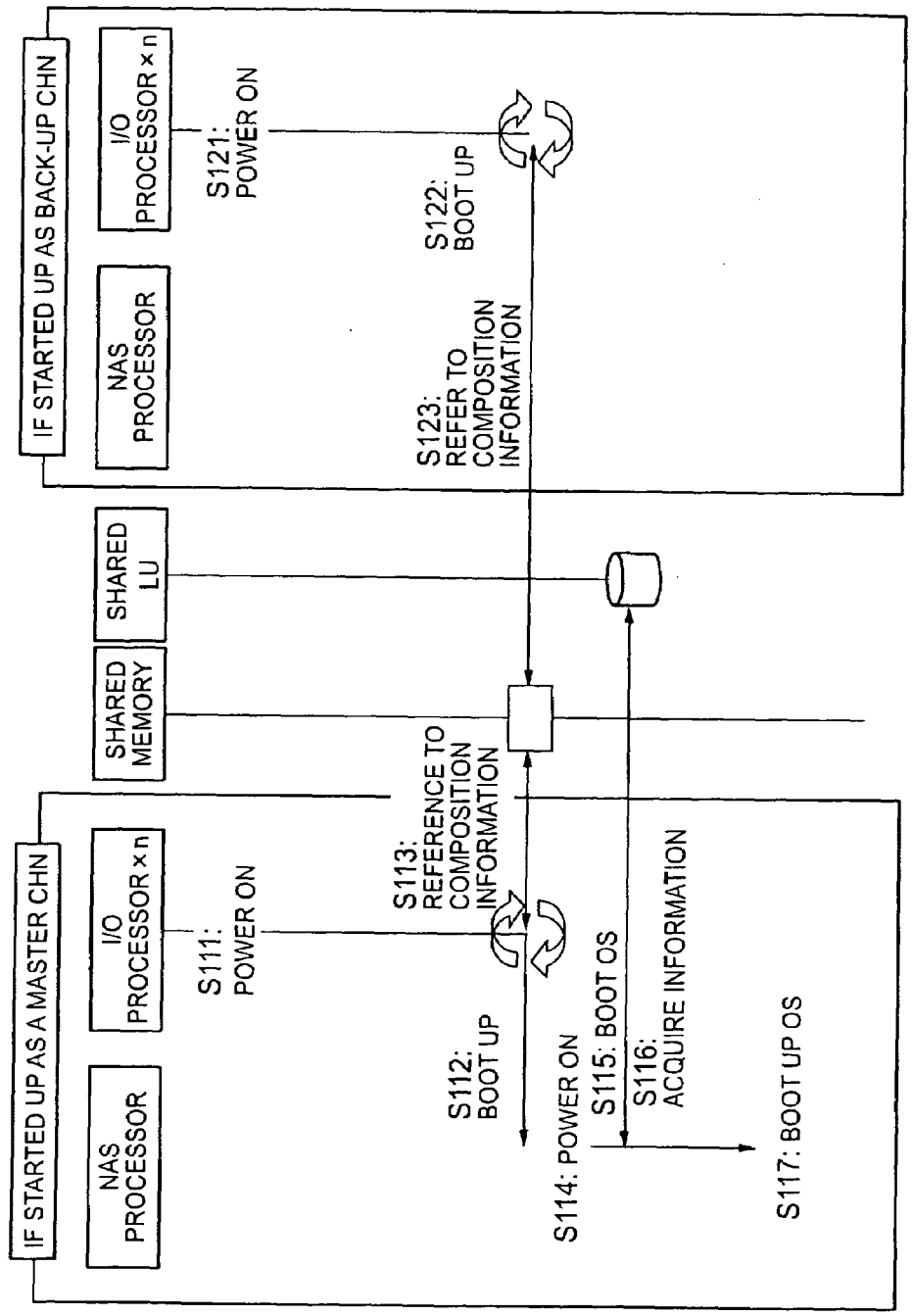
FIG. 22 shows a processing sequence in a case where the CHN 21A is incorporated into a storage control system 600 and started up.

FIG. 22 shows a processing sequence in a case where the CHN 21A is incorporated into a storage control system 600 and started up.

When the connector 509 of the CHN 21A is connected to the connecting section 26, the I/O processor 504A (and 504B) is switched on, the power supply to the I/O processor 504A assumes a power on state (S11 and S121), and prescribed startup processing is started on the basis of a program stored in the I/O memory 507, or the like (S112 and S122).

The I/O processor 504A accesses the node management data 901A in the shared memory 25, and refers to the category information, and the like, corresponding to the CHN 21A in which it is installed (S113 and S123).

If, as a result of S113 and S123, the category information is "master", then the I/O processor 504A turns on the power supply to the NAS processor (S114) and issues a boot instruction. Thereby, the NAS processor reads out the OS image from the system LU 31D (S115), acquires various information from the shared LU 31S (S116), and starts up (S117).

On the other hand, if, as a result of S113 and S123, the category information is "back up", then the I/O processor 504A assumes a standby state, without turning on the power supply to the NAS processor 506, and at a prescribed timing (for example, occasionally or periodically), it monitors the status information of the one or more master CHNs 21M corresponding to the CHN 21A in which it is installed.

According to the processing sequence shown in FIG. 22, for example, if a master CHN 21AM in which a problem has occurred is removed from the storage control system 600, and if a further CHN 21A is installed in the storage control system 600 in its place, then according to the description relating to FIG. 19 and FIG. 20, that further CHN 21A will have status information corresponding to same which indicates "back up", and therefore it will start up as a back-up CHN 21AC.

The foregoing description related to the present embodiment. In the embodiment described above, of the node management data 901A and the node correspondence data 901B contained in the CHN relationship management data 901, the node correspondence data 901B is not absolutely necessary. In the present embodiment, for the sake of convenience, associations were created between master CHNs 21AM and back-up CHNs 21AC, but it is not absolutely necessary to create these associations. In no associations are created, then each back-up CHN 21AC can be switched to any one of the master CHNs 21AM. More specifically, for example, each of a plurality of back-up CHNs 21AC refers to the status information for all the master CHNs 21AM, and the first back-up CHN 21AC to detect that the status information for any of the master CHNs 21AM has become the information "Shift Ready" indicating that it is continuable, carries out exclusion processing in such a manner that that continuation processing cannot be performed by any of the other back-up CHNs 21AC (for example, it locks the shared LU), whereupon it carries out the continuation processing described above.

According to the present embodiment described above, there exist one or more back-up CHNs 21AC which are in a standby state in such a manner that they can operate as a master CHN 21A in place of a master CHN 21A, if that master CHN 21AM produces a problem, or the like. In each of the back-up CHNs 21AC, the power supply to the I/O processor 504 is on, but the NAS processor 506, which has a greater power consumption than the I/O processor 504 is set to a cold standby state in which its power supply is off. Therefore, the standby state of the back-up CHN 21A is able to reduce the amount of power consumed by the storage control system 600 overall, in comparison with a case where the CHN is set to a hot standby state in which the power supply to both the I/O processor 504 and the NAS processor 506 are left on. This has a greater effect, the larger the number of back-up CHNs 21A.

Moreover, according to the present embodiment described above, since the power supply of the back-up NAS processor 506 is off, it is not necessary to perform control between the master NAS processor 506 and the back-up NAS processor 506 (in other words, cluster control at the file system level). Therefore, the load on the master NAS processor 506 is reduced.

Moreover, according to the present embodiment described above, the back-up CHN 21AC is able to operate, as a master CHN 21AM, in place of one master CHN 21AM selected from a plurality of master CHNs 21AM. Normally, the number of CHNs 21A which can be fitted in a storage control system 600 is limited, but it is possible to install a larger number of master CHNs 21AM within this limited number.

Moreover, in the present embodiment described above, taking the number of master CHNs 21AM to be M and the number of back-up CHNs 21AC to be N, then if M<N, when a master CHN 21AM breaks down, there will necessarily exist a back-up CHN 21AC that is capable of being switched to replace that master CHN 21AM, and hence it is possible to reduce the possibility of trouble arising, such as an interruption to the operation of the whole system. Furthermore, since the number of master CHNs 21AM is fewer, then the power saving effect is increased. On the other hand, if M>N, then since there is a greater number of master CHNs 21AM, the processing performance in the storage control system 600 is increased. Moreover, since there is no need to prepare a back-up CHN 21AC corresponding to each one of the master CHNs 21AM, then a relatively small size system is required compared to the performance and reliability it affords. Furthermore, since the back-up CHNs 21AC are in a cold standby state, then the power saving effect is greater, in comparison with the size.

A number of modification examples can be conceived with respect to the present embodiment. Before explaining these various modification examples, the concepts relating to one characteristic feature of the present embodiment will be confirmed.

Figure 23:
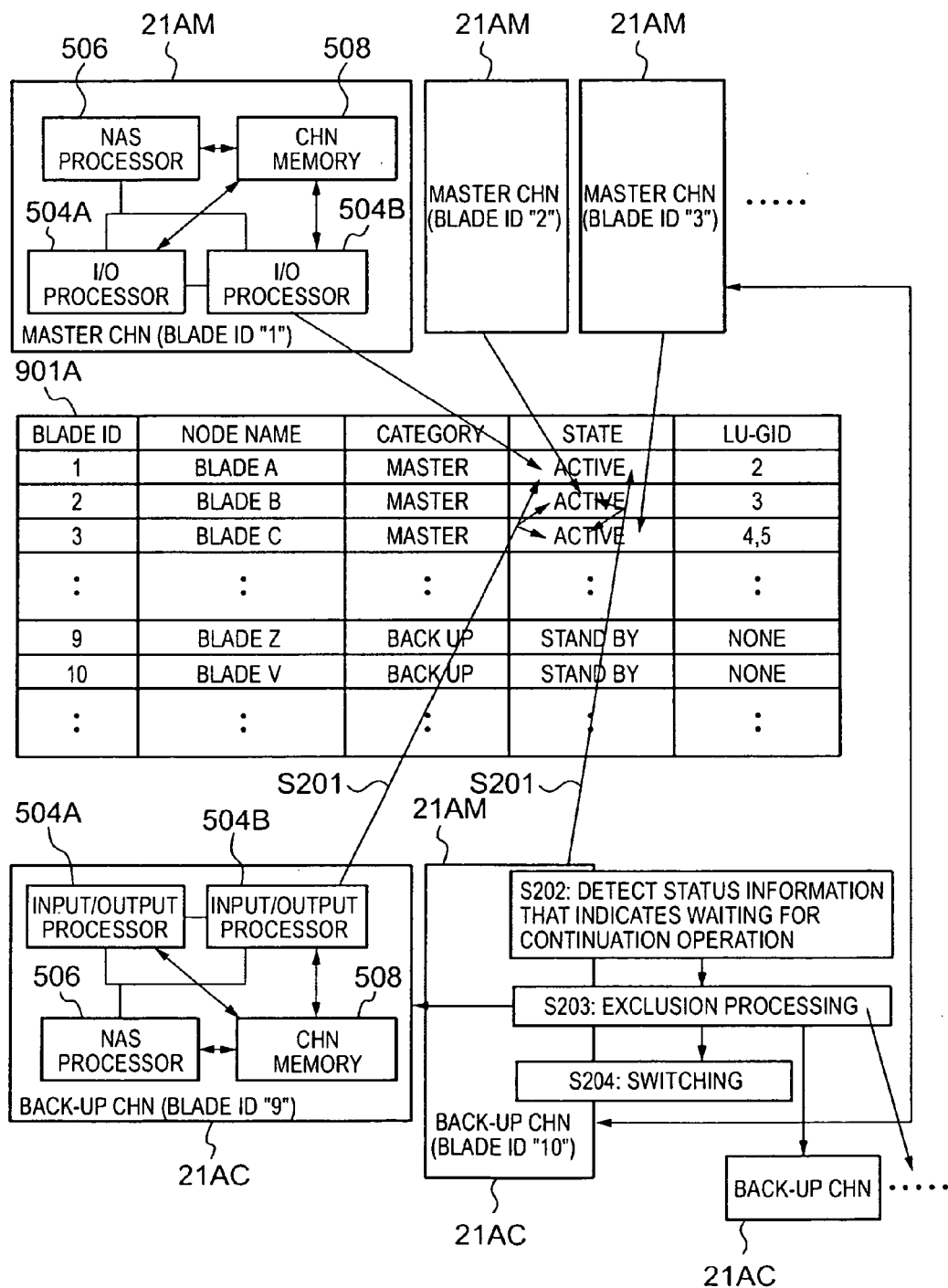
FIG. 23 shows an overview relating to one characteristic feature of the present embodiment.

FIG. 23 shows an overview relating to one characteristic feature of the present embodiment.

Two or more (or one) master CHN 21AM and two or more (or one) back-up CHNs 21AC in a cold standby state are provided in the storage control system 600. Moreover, node management data 901A containing a plurality of attribute information elements (for example, blade ID, category information, status information and information containing the LU-GID) corresponding to each of the respective plurality of CHNs 21A is registered in the shared memory 25.

If a switching cause, such as a problem, has occurred, then the master I/O processor 504 of each master CHN 21AM turns off the power supply of the master NAS processor 506, and changes the status information corresponding to the CHN 21AM in which it is installed (the status information in the node management data 901A), to information indicating switching (hereinafter, called "switching status information").

The cold I/O processor 504 of each of the two or more back-up CHNs 21AC accesses the node management data 901A, and refers to the status information of either all of the master CHNs 21AM or the master CHNs 21AM with which it is associated (S201). If the cold I/O processor 504 detects switching status information (S202), then it executes processing for excluding the other back-up CHNs 21AC, in such a manner that switching is not carried out between the master CHN 21AM corresponding to the switching status information and the other back-up CHNs 21AC (S203). More specifically, for example, the cold I/O processor 504 either locks the shared LU, or it sets a flag associated with switching status information, in the node management data 901A, or the like. When exclusion processing has been completed, the cold I/O processor 504 then executes the switching processing described above (S204). Thereby, the back-up CHN 21AC in which that cold I/O processor 504 is installed becomes able to operate as a master CHN 21AM, in the place of the master CHN 21AM corresponding to the switching status information.

Below, a number of modification examples are described.

Figure 24:
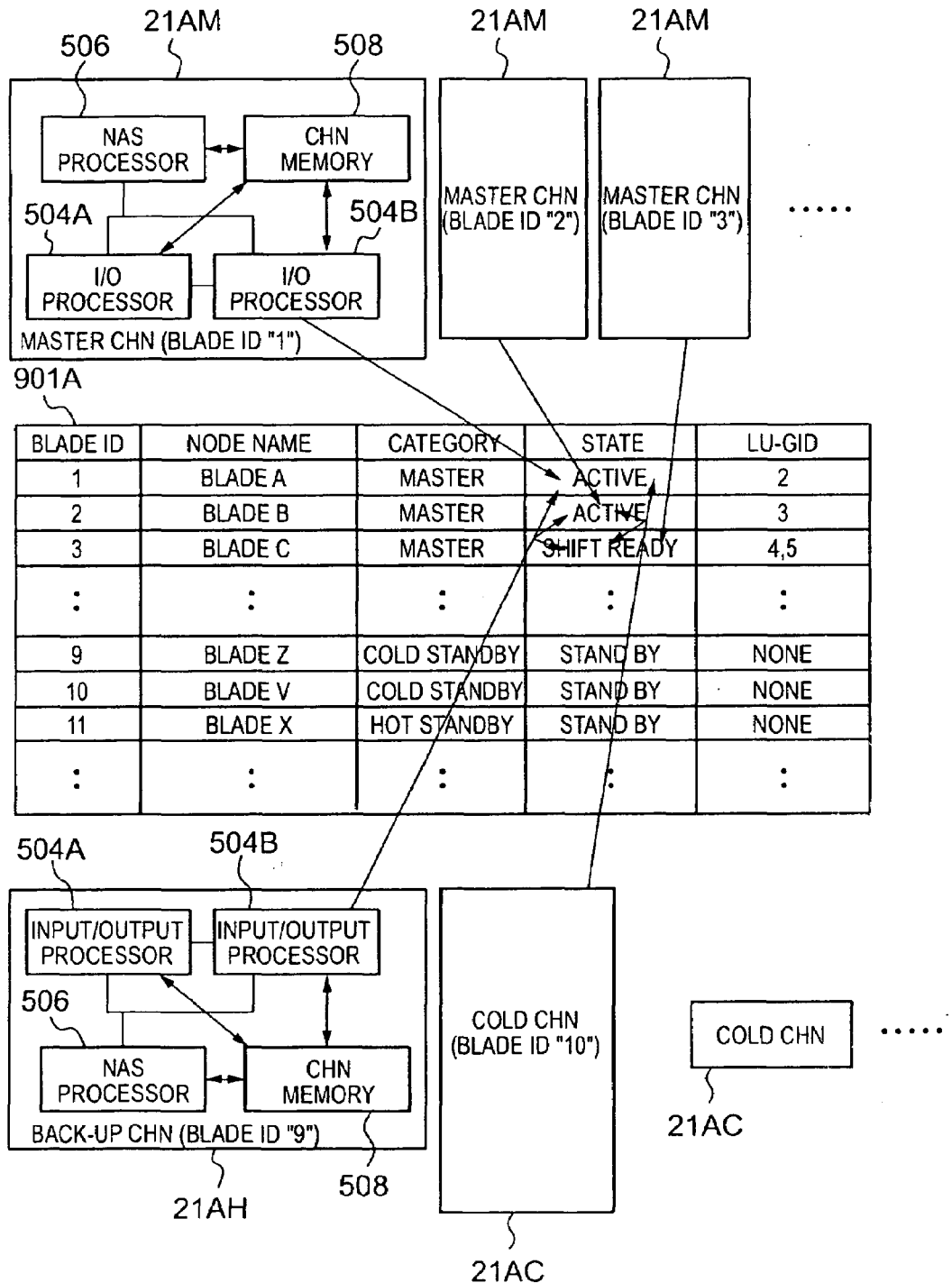
FIG. 24 is a block diagram showing an overview of a first modification example of the present embodiment.

FIG. 24 is a block diagram showing an overview of a first modification example of the present embodiment.

The storage control system 600 relating to a first modification example of the present embodiment comprises, in addition to two or more (or one) master CHNs 21AM and two or more (or one) back-up CHN in a cold standby state (hereinafter, called a "cold CHN") 21AC, one or more back-up CHN in a hot standby state (hereinafter, called a "hot CHN") 21AH. A hot standby state is a standby state in which the power supply to the NAS processor 506 is switched on, as described previously.

In this first modification example, "cold standby" indicating a cold CHN 21AC, and "hot standby" indicating a hot CHN 21AH are registered in the node management data 901A as category information corresponding to a CHN 21A, instead of "back up".

Figure 25:
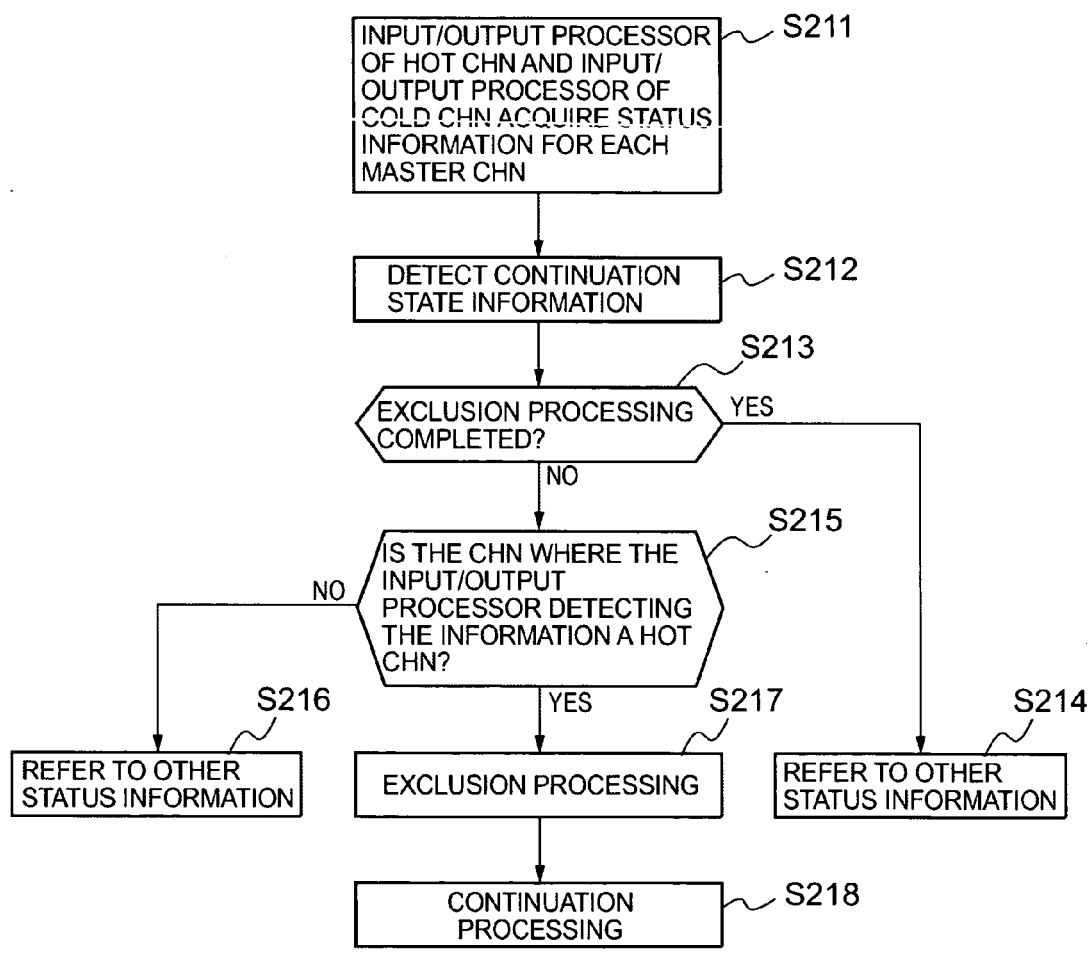
FIG. 25 shows one example of a processing sequence carried out in a first modification example of the present embodiment.

FIG. 25 shows one example of a processing sequence carried out in a first modification example of the present embodiment.

If a switching cause, such as a problem, has occurred, then the master I/O processor 504 of each master CHN 21AM turns off the power supply of the master NAS processor 506, and changes the status information corresponding to the CHN 21AM in which it is installed (the status information in the node management data 901A), to information indicating a continuable state (for example, "Shift Ready", hereinafter referred to as "continuation status information").

The I/O processor 504 of each of the two or more cold CHNs 21AC and the I/O processor 504 of each of the one or more hot CHNs 21AH access the node management data 901A, and refer to the status information of either all of the master CHNs 21AM or the master CHNs 21AM with which they are respectively associated (S211).

If the I/O processor 504 detects continuation status information (S212), then if exclusion processing has already been carried out with respect to the master CHN 21AM having the continuation status information (Y at S213), the I/O processor 504 refers to the status information of the other master CHNs 21AM (or alternatively, if it has finished referring to all of the status information elements, then it may terminate processing) (S214).

If, on the other hand, the I/O processor 504 detects continuation status information (S212), and exclusion processing has not yet been carried out for the master CHN 21AM having that continuation status information (N at S213), then the I/O processor 504 determines whether the CHN 21A in which it is installed is a hot CHN 21AH or a cold CHN 21AC (S215). This judgment can be made, for example, by referring to whether the category information corresponding to the CHN 21A in which the I/O processor 504 is installed indicates "hot standby" or "cold standby", or by means of another method.

If, as a result of the judgment in S215, it is judged that the CHN is a cold CHN 21AC (N at S215), then the I/O processor 504 refers to the status information of the other master CHNs 21AM (or alternatively, if it has finished referring to all of the status information elements, then it may terminate processing) (S216). In other words, the process waits until continuation status information is detected by a hot CHN 21AH.

If, on the other hand, as a result of the judgment at S215, the CHN is judged to be a hot CHN 21AH (Y at S215), then the I/O processor 504 carries out exclusion processing with respect to the master CHN 21AM corresponding to the continuation status information detected at S212 (S217), and carries out switching processing (S218). Thereby, the hot CHN 21AH in which that I/O processor 504 is installed becomes able to operate as a master CHN 21AM, in the place of the master CHN 21AM corresponding to the continuation status information.

Figure 26:
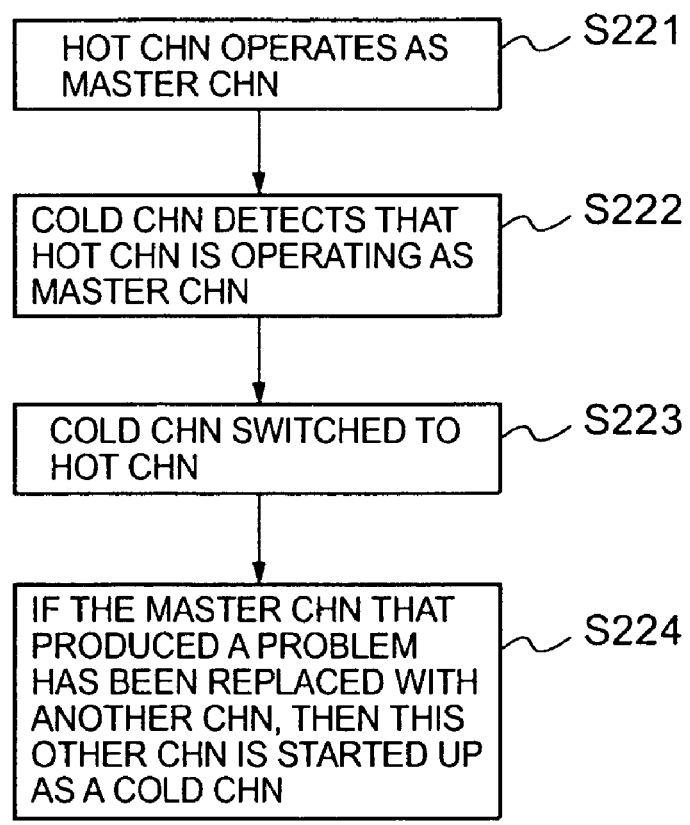
FIG. 26 shows one example of a processing sequence carried out in a first modification example of the present embodiment.

FIG. 26 shows a further example of a processing sequence carried out in a first modification example of the present embodiment.

According to the processing sequence illustrated in FIG. 25, if a hot CHN 21AH operates as a master CHN 21AM (S221), then this fact is detected by a cold CHN 21AC (S222). This may be detected, for example, by means of the I/O processor 504 of the hot CHN 21AH reporting the fact that it is operating as a master CHN 21AM, to the I/O processor 504 of a cold CHN 21AH, via a cache memory 24 or a shared memory 25, or by another method.

If the I/O processor 504 of a cold CHN 21AC detects that a hot CHN 21AH is operating as a master CHN 21AM, then that I/O processor 504 turns on the power supply of the NAS processor 506, and the cold CHN 21AC is set to a standby state as a hot CHN 21AH (S223). In this case, the I/O processor 504 changes the category information corresponding to the CHN 21A in which it is installed, from "cold standby" to "hot standby".

Thereafter, if the master CHN 21AM which produced a problem is exchanged with another CHN 21A, then as described above, that CHN 21A is started up as a cold CHN 21AC, by referring to the node management data 901A (S224).

The foregoing description related to a first modification example. The processing sequence carried out when switching a hot CHN 21AH to a master CHN 21AM is not illustrated specifically, but in this processing sequence, similarly to the processing sequence carried out when switching a cold CHN 21AC to a master CHN 21AM, processing is implemented for acquiring continuation information from the master CH 21AM, in the NAS processor 506 of the hot CHN 21AH.

According to this first modification example, when a CHN 21A in a standby state is switched to replace a master CHN 21AM, preference is given to switching a hot CHN 21AH, rather than a cold CHN 21AC, to be a master CHN 21AM. Thereafter, if the cold CHN 21AC is switched to a hot CHN 21AH, and a further CHN 21A is installed in place of the master CHN 21AM which produced a problem, then that further CHN 21A is started up as a cold CHN 21AC. Thereby, it is possible to reduce the amount of power consumed by the storage control system 600, whilst also shortening the time period taken by fail over processing for switching from a standby state, to a state of operation as a master CHN 21AM.

In the second modification example of the present embodiment, for example, the changing of the category information (for instance, the change from "master" to "back-up", and/or the change from "back-up" to "master") may be carried out by the I/O processor 504 of the master CHN 21AM, instead of the I/O processor 504 of the back-up CHN 21AC.

In a third embodiment of the present embodiment, for example, the mapping of the CHNs 21A and the LUs may be carried out with respect to each individual LU, rather than in units of LU groups. More specifically, for example, in the node management data 901A, it is possible to register a LUN used by a CHN 21A, for each respective CHN 21A.

Above, an embodiment and modifications of the present invention were described, but these are simply examples for the purpose of describing the present invention and the scope of the present invention is not limited to this embodiment and these modifications alone. The present invention may be implemented in various further modes.

What is claimed is:

1. A storage control system for controlling the storage of data in storage devices, comprising:

a plurality of storage devices for storing data;

a storage device control section for controlling storing of data in said plurality of storage devices;

a connecting section connected to said storage device control section;

a plurality of channel control sections connected to a local area network external to said storage control system, and to said connecting section;

a shared memory in which control information exchanged by a first channel section of said channel control sections and said storage device control section is stored; and a cache memory for temporarily holding data exchanged between said first channel control section and said storage device control section;

wherein said plurality of channel control sections includes one or more first channel control sections and one or more second control sections;

each of said first channel control sections having a first processor for converting file level data received via said local area network into block level data, and a second processor for storing said block level data in said storage devices, via said connecting section and said storage device control section, and said first processor and said second processor operating normally in a normal state;

each of said second channel control sections having a third processor for converting file level data received via said local area network into block level data, and a fourth processor for storing said block level data in said storage devices, via said connecting section and said storage device control section, and said third processor assuming a power saving state in cases where said first channel control section is operating normally, and said third processor operating in a normal state, in cases where a problem has occurred in said first channel control section; and said second processor of said first channel control section and said fourth processor of said second channel control section communicating the fact that a problem has occurred in said first channel control section, by means of said shared memory.

2. The storage control system according to claim 1, wherein said second processor of said first channel control section writes problem occurrence information indicating that said problem has occurred, to said shared memory; and said fourth processor in any one of a plurality of said second channel control sections, if detecting said problem occurrence information, carries out exclusion processing for prohibiting a further second channel control section from switching to said first channel control section, and executes switching processing for switching said one second channel control section to said first channel control section.

3. The storage control system according to claim 1, wherein said second processor of said first channel control section sets said first processor to a power saving state, if said problem has occurred; and said fourth processor of said second channel control section releases the power saving state of said third processor, if detecting that said problem has occurred in said first channel control section.

4. The storage control system according to claim 1, wherein category information indicating whether a channel control section is a first or a second channel control section is registered in said shared memory, for each of said plurality of channel control sections; and said second processor or said fourth processor changes the category information corresponding to said first channel control section, to information indicating that the corresponding channel control section is a second channel control section, if said problem has occurred.

5. The storage control system according to claim 1, wherein two or more logical units, which are logical devices for storing data, are provided in said plurality of storage devices;

corresponding logical unit information indicating which logical unit is used by a channel control section, of said two or more logical units, is registered in said shared memory for each of said plurality of channel control sections; and said second processor or said fourth processor erases the first corresponding logical unit information corresponding to said first channel control section, if said problem has occurred, and associates said first corresponding logical unit information with said second channel control section.

6. The storage control system according to claim 1, wherein correspondence data indicating correspondence relationships between said first channel control sections and said second channel control sections is stored in said shared memory;

said first channel control sections and said second channel control sections being associated, in said correspondence data, in at least one of the following states, (A)–(D):

(A) the number of said second channel control sections corresponding to one of said first channel control sections is one, and the number of said first channel control sections corresponding to one of said second channel control sections is also one;

(B) the number of said second channel control sections corresponding to one of said first channel control sections is two or more, but the number of said first channel control sections corresponding to one of said second channel control sections is one;

(C) the number of said first channel control sections corresponding to one of said second channel control sections is two or more, but the number of said second channel control sections corresponding to one of said first channel control sections is one; and (D) the number of said second channel control sections corresponding to one of said first channel control sections is two or more, and the number of said first channel control sections corresponding to one of said second channel control sections is also two or more; and said fourth processor of said second channel control section refers to said correspondence data, and if a problem has occurred in a first channel control section corresponding to the second channel control section in which that fourth processor is installed, then releases the power saving state of the third processor in said second channel control section in which it is installed.

7. The storage control system according to claim 1, wherein, in said first channel control section, a plurality of second processors exist with respect to each first processor, and even if a problem occurs in any one of the plurality of second processors, then a further second processor of said plurality of second processors writes the fact that said problem has occurred, to said shared memory.

8. The storage control system according to claim 1, wherein said plurality of channel control sections include one or more third channel control sections;

each of said third channel control sections having a fifth processor for converting file level data received via said local area network into block level data, and a sixth processor for storing said block level data in said storage devices, via said connecting section and said storage device control section;

said second channel control section and said third channel control section assuming a standby state in such a manner that they can operate as a first channel control section, in the place of said first channel control section in which said problem has occurred, but the fifth processor of said third channel control section assuming a normal state, unlike the third processor of said second channel control section; and if said problem has occurred in said first channel control section, then said third channel control section becomes said first channel control section, by means of said fifth processor of said third channel control section operating in a normal state, and the power saving state of said third processor of said second channel control section is released and said second channel control section becomes said third channel control section.

9. The storage control system according to claim 8, wherein said second processor of said first channel control section writes problem occurrence information indicating that said problem has occurred, to said shared memory; and said fourth processor of each of said plurality of second channel sections, and said sixth processor of each of said one or more third channel control sections accesses said shared memory, and if said fourth processor has detected said problem occurrence information prior to said sixth processor, then said fourth processor ignores said problem occurrence information.

10. The storage control system according to claim 8, wherein, if a separate channel control section to a first channel control section in which said problem has occurred is installed in said storage control system, then said separate channel control section is started up as said second channel control section.

11. A control method for a storage control system for controlling storing data in storage devices, wherein said storage control system comprises a plurality of channel control sections connected to a local area network that is external to said storage control system;

said plurality of channel control sections includes one or more first channel control section which is in a normal state, and one or more second channel control sections which assume a standby state in which they can operate as said first channel control sections;

said first channel control sections having a first and a second processor;

said second channel control sections having a third and a fourth processor;

said first and said third processor being processors which receive file level data from said external local area network and convert said file level data into block level data, when in a normal state; and said second and said fourth processors being processors which output said converted block level data to said storage devices, when in a normal state; and said control method comprising the steps of:

if a problem has occurred in said first channel control section, said second processor records the fact that said problem has occurred, in a shared memory;

said fourth processor of said second channel control section refers to said shared memory and detects the fact that said problem has occurred in said first channel control section; and said third processor of said second channel control section releases said power saving state, if it has been detected that said problem has occurred.

12. The control method according to claim 11, comprising the steps of:

said second processor of said first channel control section writes problem occurrence information indicating that said problem has occurred, to said shared memory; and said fourth processor in any one of a plurality of said second channel control sections, if detecting said problem occurrence information, carries out exclusion processing for prohibiting a further second channel control section from switching to said first channel control section, and executes switching processing for switching said one second channel control section to said first channel control section.

13. The control method according to claim 11, comprising the steps of:

said second processor of said first channel control section sets said first processor to a power saving state, if said problem has occurred; and said fourth processor of said second channel control section releases the power saving state of said third processor, if detecting that said problem has occurred in said first channel control section.

14. The control method according to claim 11, comprising the steps of:
category information indicating whether a channel control section is a first or a second channel control section is registered in said shared memory, for each of said plurality of channel control sections; and
said second processor or said fourth processor changes the category information corresponding to said first channel control section, to information indicating that the corresponding channel control section is a second channel control section, if said problem has occurred.

15. The control method according to claim 11, wherein two or more logical units, which are logical devices for storing data, are provided in said plurality of storage devices;
corresponding logical unit information indicating which logical unit is used by a channel control, of said two or more logical units, is registered in said shared memory for each of said plurality of channel control sections; and
said control method comprises a step whereby said second processor or said fourth processor erases the first corresponding logical unit information corresponding to said first channel control section, if said problem has occurred, and associates said first corresponding logical unit information with said second channel control section.

16. The control method according to claim 11, wherein correspondence data indicating the-correspondence relationships between said first channel control sections and said second channel control sections is stored in said shared memory;
said first channel control sections and said second channel control sections being associated, in said correspondence data, in at least one of the following states, (A)–(D):
(A) the number of said second channel control sections corresponding to one of said first channel control sections is one, and the number of said first channel control sections corresponding to one of said second channel control sections is one;
(B) the number of said second channel control sections corresponding to one of said first channel control sections is two or more, but the number of said first channel control sections corresponding to one of said second channel control sections is one;
(C) the number of said first channel control sections corresponding to one of said second channel control sections is two or more, but the number of said second channel control sections corresponding to one of said first channel control sections is one; and
(D) the number of said second channel control sections corresponding to one of said first channel control sections is two or more, and the number of said first channel control sections corresponding to one of said second channel control sections is also two or more; and
said control method comprises a step whereby said fourth processor of said second channel control section refers to said correspondence data, and if a problem has occurred in a first channel control section corresponding to the second channel control section in which that fourth processor is installed, then releases the power saving state of the third processor in said second channel control section in which it is installed.

17. The control method according to claim 11, wherein there exists a plurality of second processors for each first processor in said first channel control sections; and
said control method a step whereby if a problem occurs in any one of the plurality of second processors, then a further second processor of said plurality of second processors writes the fact that said problem has occurred, to said shared memory.

18. The control method according to claim 11, wherein said plurality of channel control sections include one or more third channel control sections, which assume a standby state in such a manner that they can operate as said first channel control sections;
said third channel control sections having a fifth and a sixth processor which are in a normal state;
said fifth processor being a processor which receives file level data from said external local area network and converts same to block level data, when in a normal state;
said sixth processor being a processor which outputs said converted block level data to said storage devices, when in a normal state; and
said control method comprising steps whereby:
said sixth processor of said third channel control section refers to said shared memory and detects the fact that said problem has occurred in said first channel control section;
said fifth processor of said third channel control section acquires information used by said first processor of said first channel control section, and causes said third channel control section to operate as a first channel control section; and
said third processor of said second channel control section releases said power saving state, when said third channel control section operates as said first channel control section.

19. The control method according to claim 18, comprising the steps of:
said second processor of said first channel control section writes problem occurrence information indicating that said problem has occurred, to said shared memory;
said fourth processor of each of said plurality of second channel control sections, and said sixth processor of each of said one or more third channel control sections accesses said shared memory; and
if said fourth processor has detected said problem occurrence information prior to said sixth processor, then said fourth processor ignores said problem occurrence information.

20. The control method according to claim 18, further comprising a step whereby if a separate channel control section to a first channel control section in which said problem has occurred is installed in said storage control system, then said separate channel control section is started up as said second channel control section.

* * * * *